Dec. 17, 1935.  M. ROMAINE ET AL  2,024,253
BROACHING MACHINE
Filed Aug. 10, 1934  9 Sheets-Sheet 1
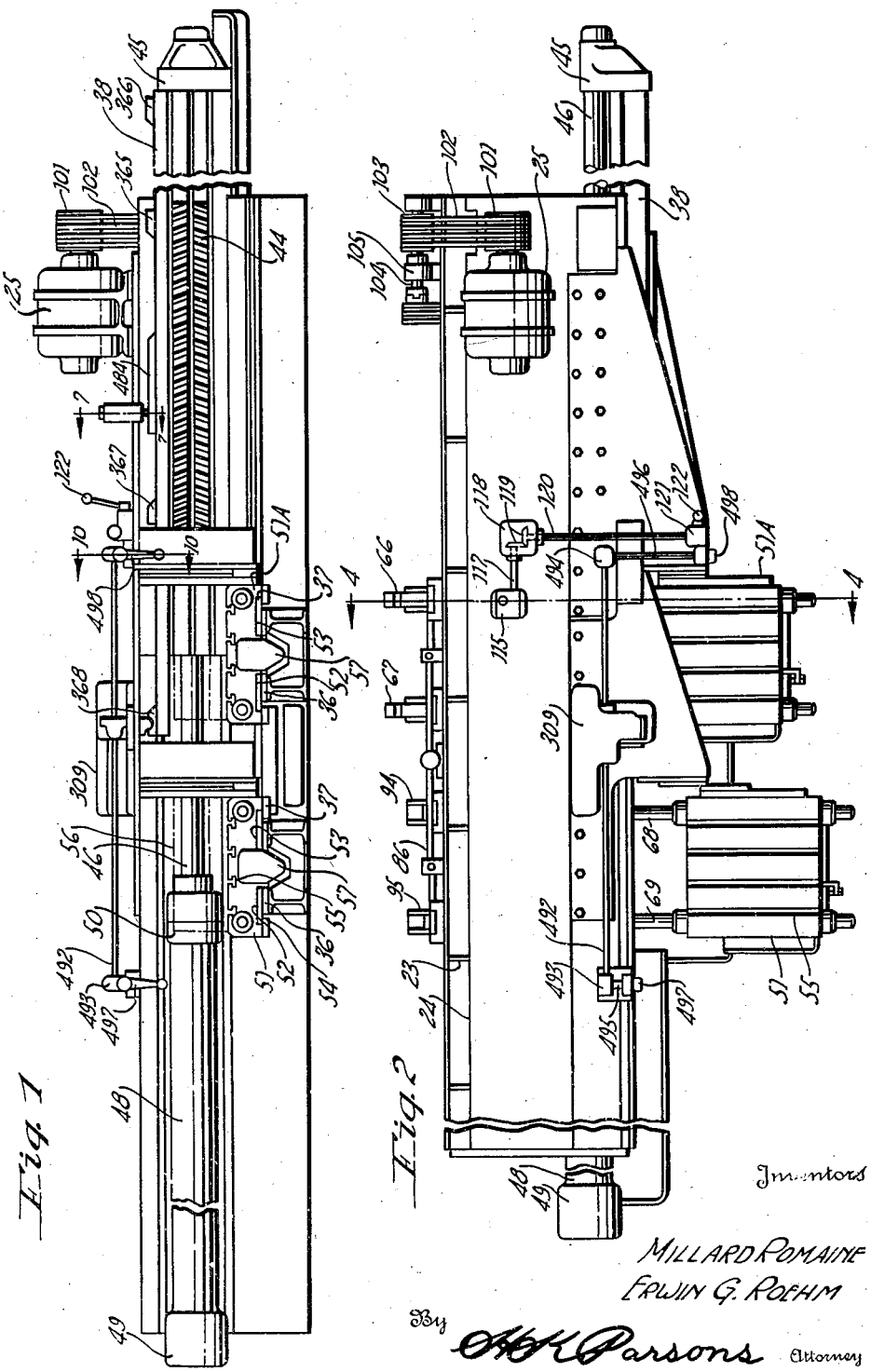
Inventors
MILLARD ROMAINE
ERWIN G. ROEHM
By AHK Parsons  Attorney

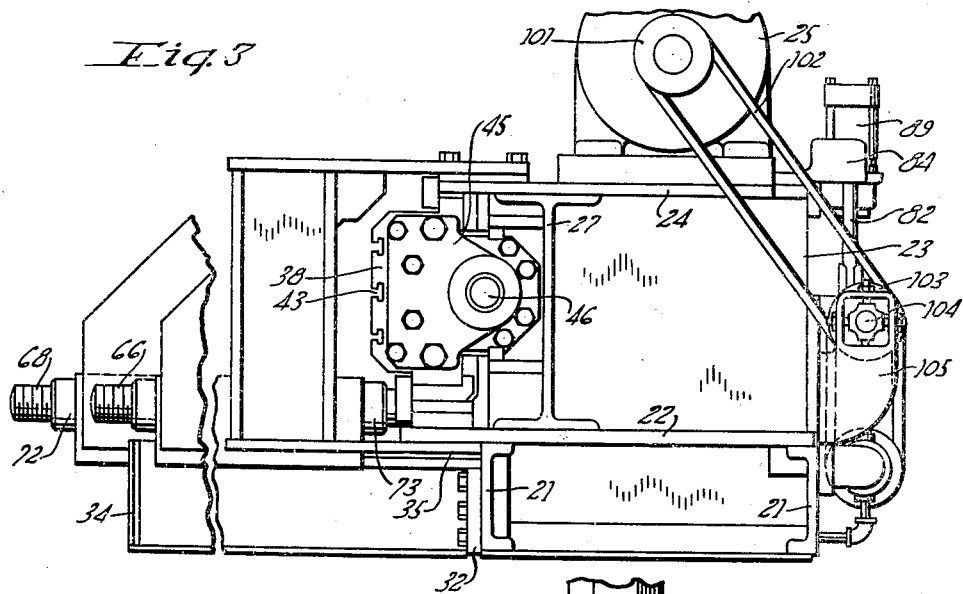
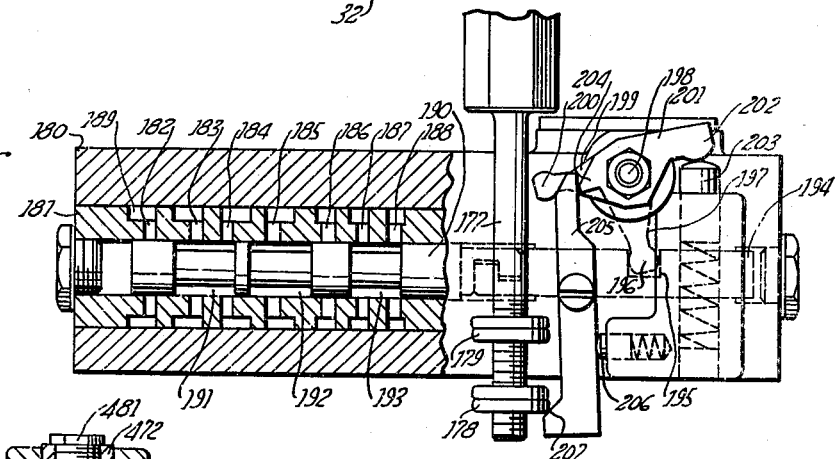
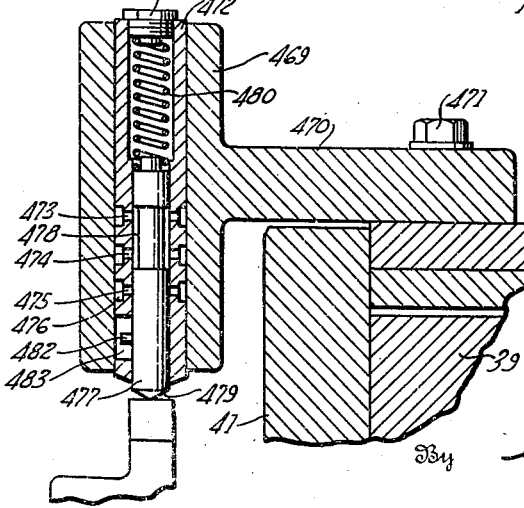

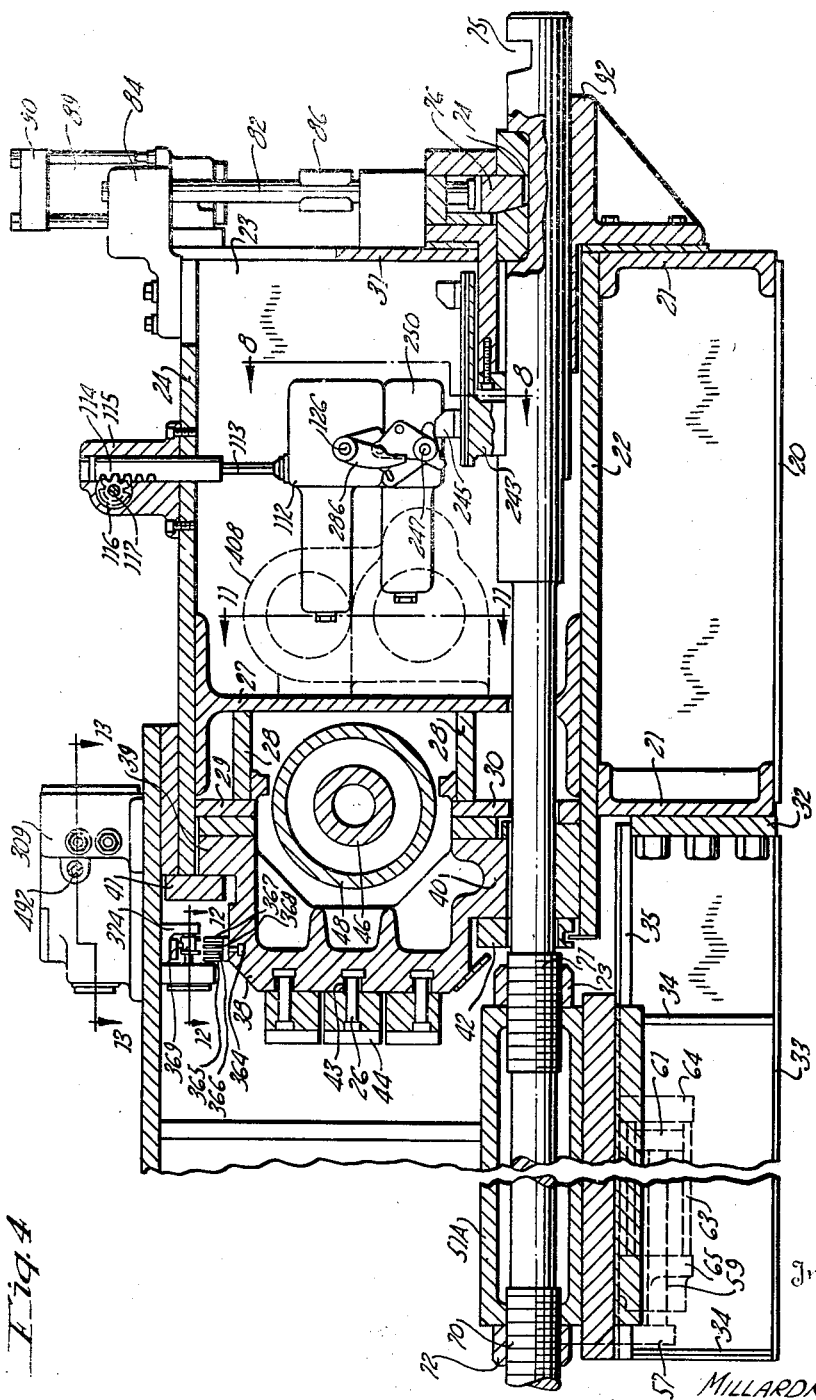

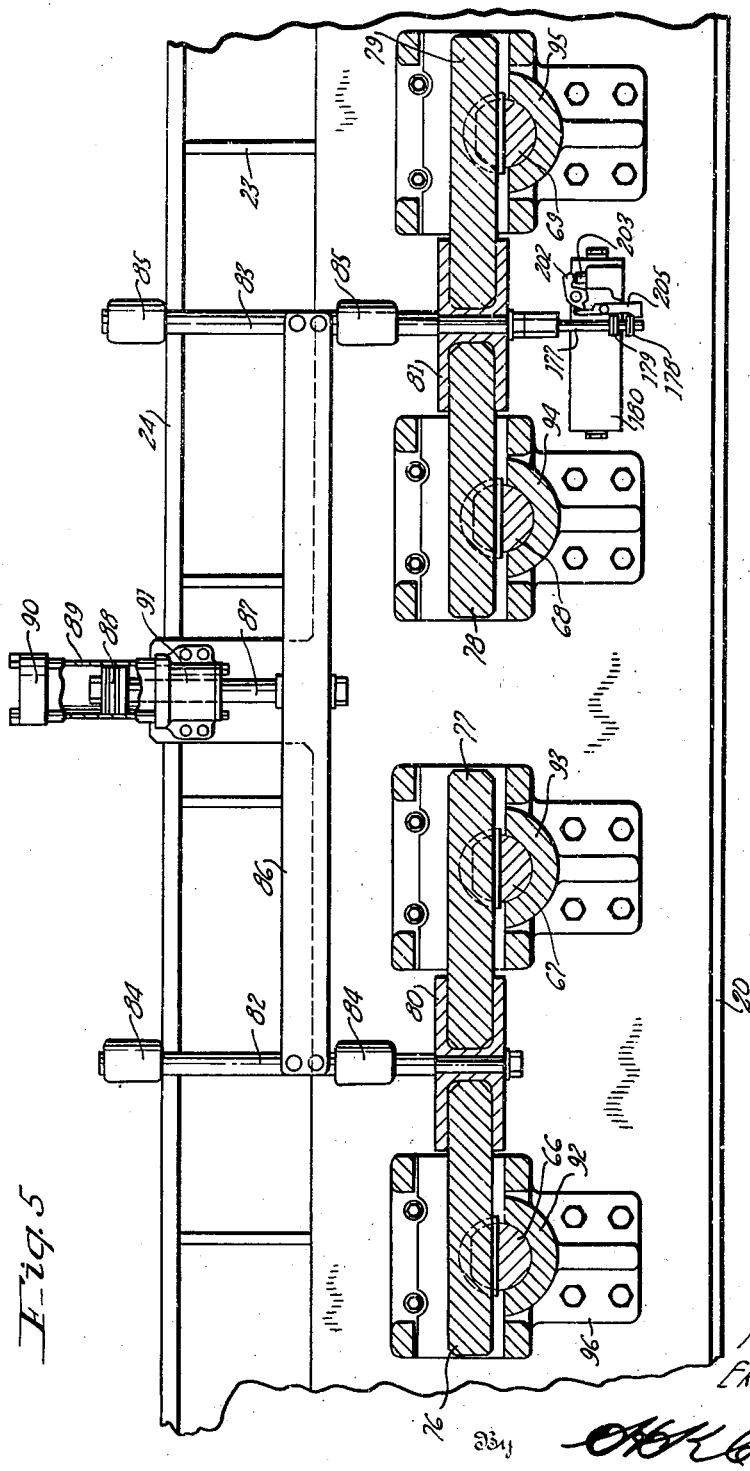

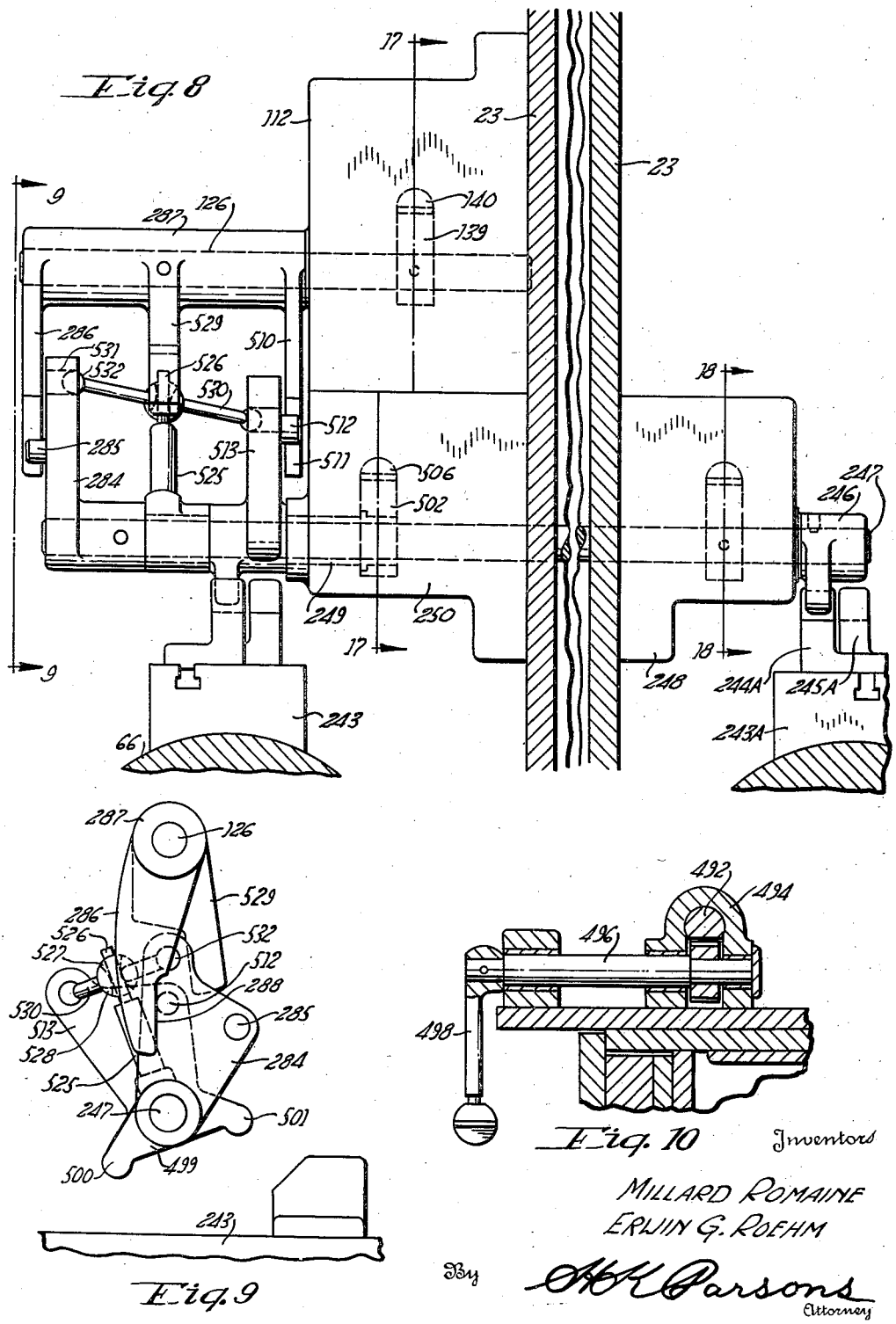

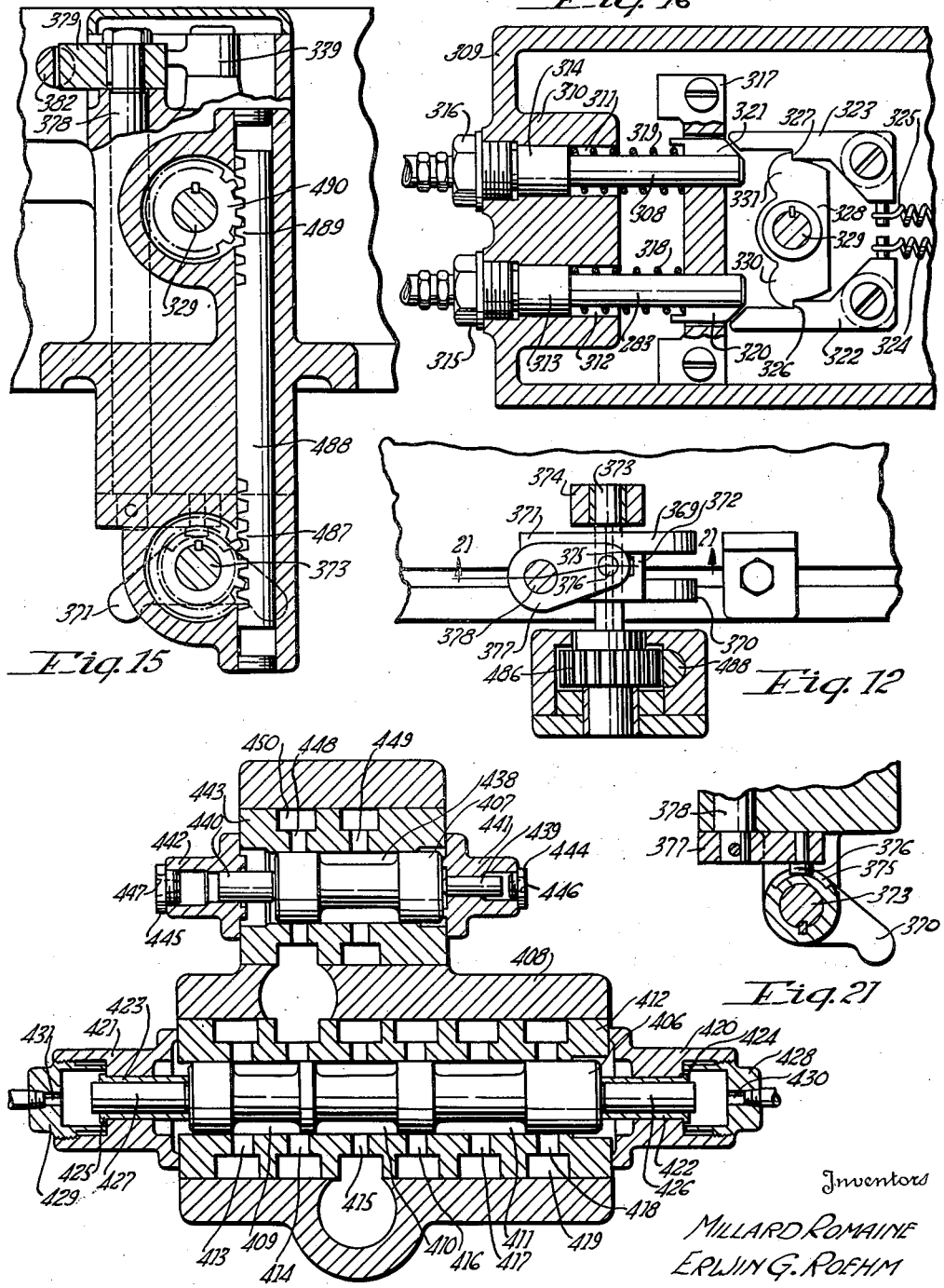

Dec. 17, 1935.  M. ROMAINE ET AL  2,024,253
BROACHING MACHINE
Filed Aug. 10, 1934  9 Sheets-Sheet 7
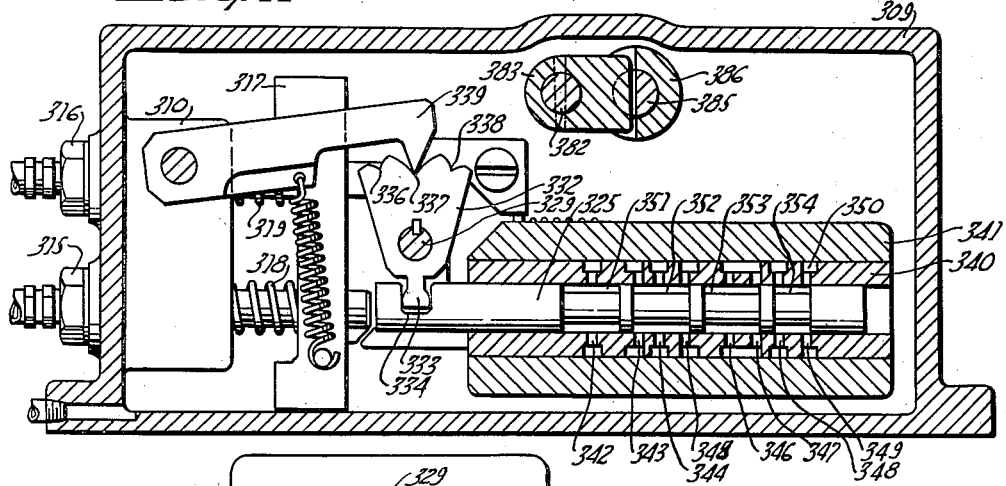
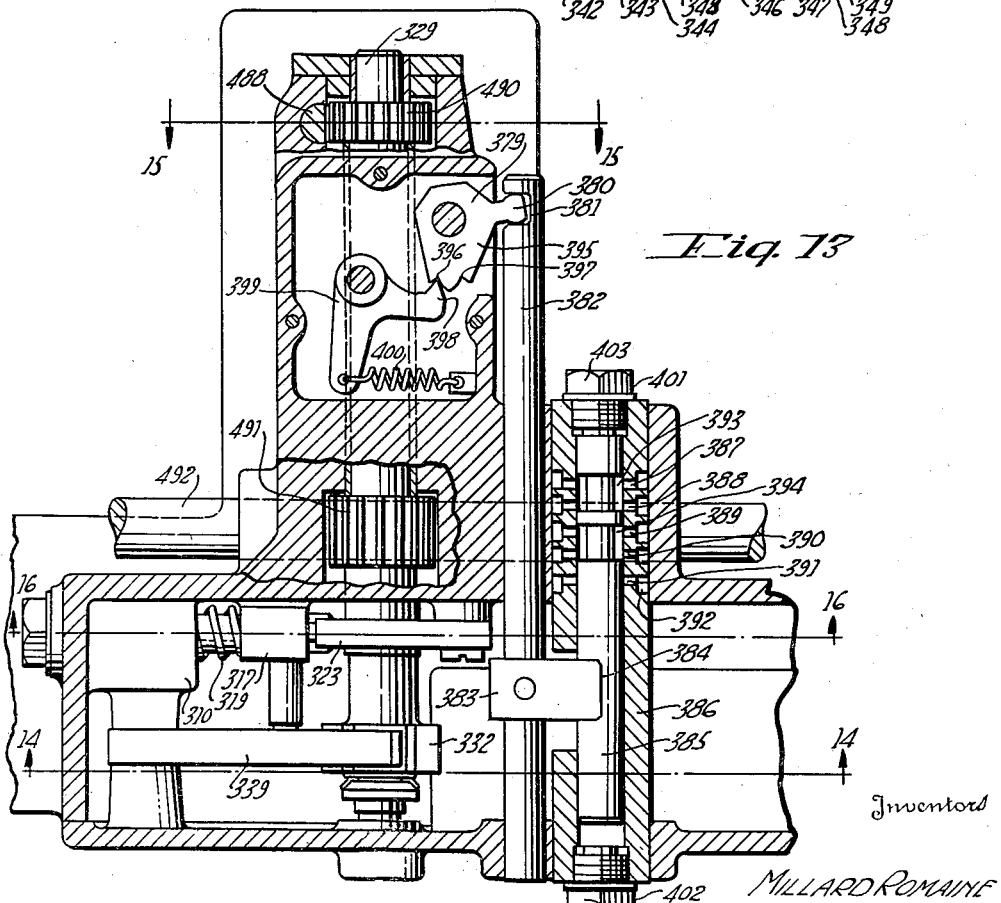
Inventors
MILLARD ROMAINE
ERLING G. ROEHM
By  H. K. Parsons
Attorney Dec. 17, 1935.  M. ROMAINE ET AL  2,024,253
BROACHING MACHINE
Filed Aug. 10, 1934  9 Sheets-Sheet 8
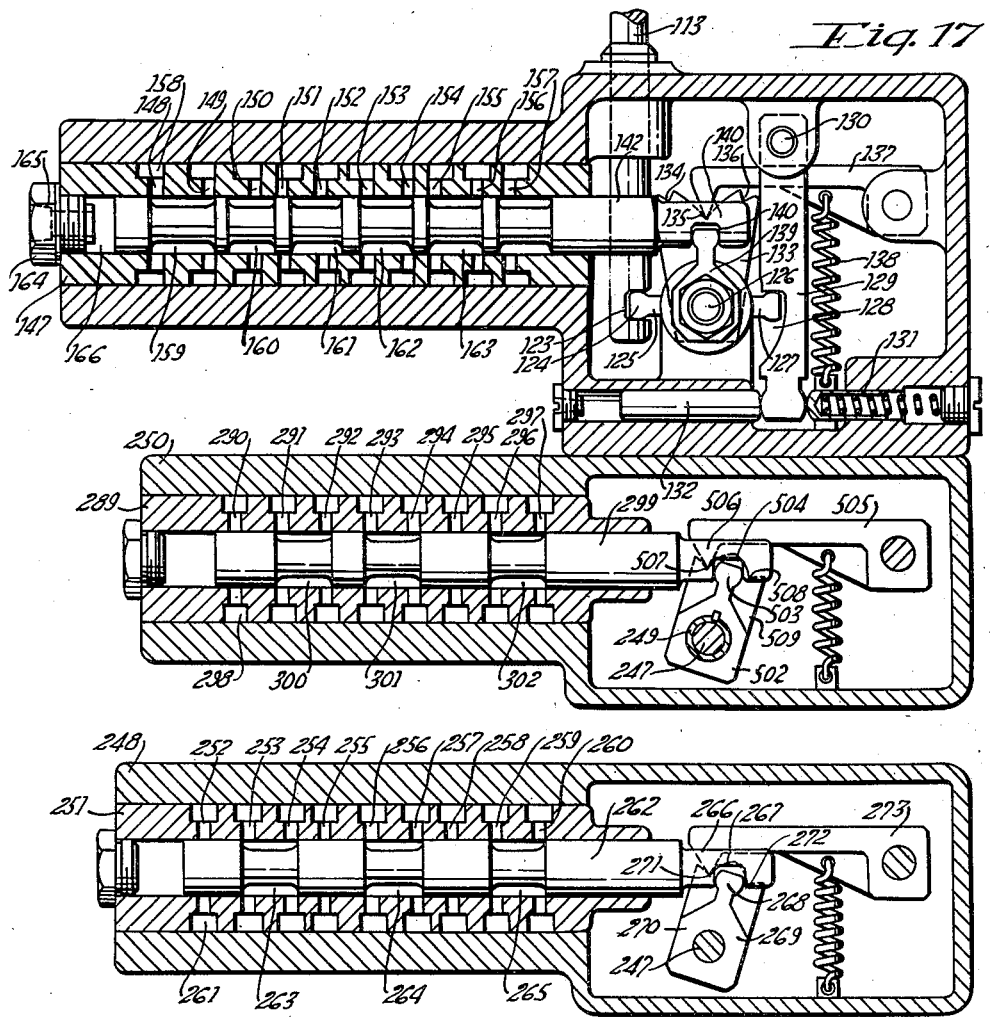
Fig. 17
Fig. 18
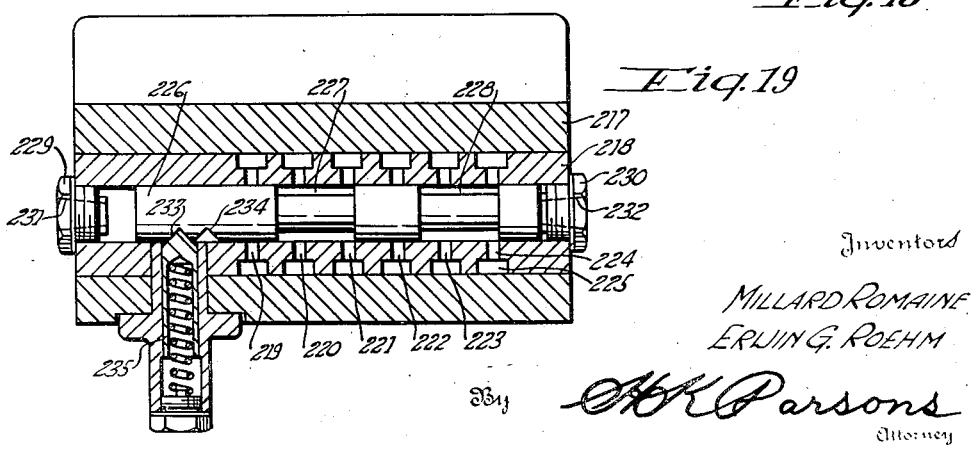
Fig. 19
Inventors
MILLARD ROMAINE
ERWIN G. ROEHM
By A.K. Parsons
Attorney

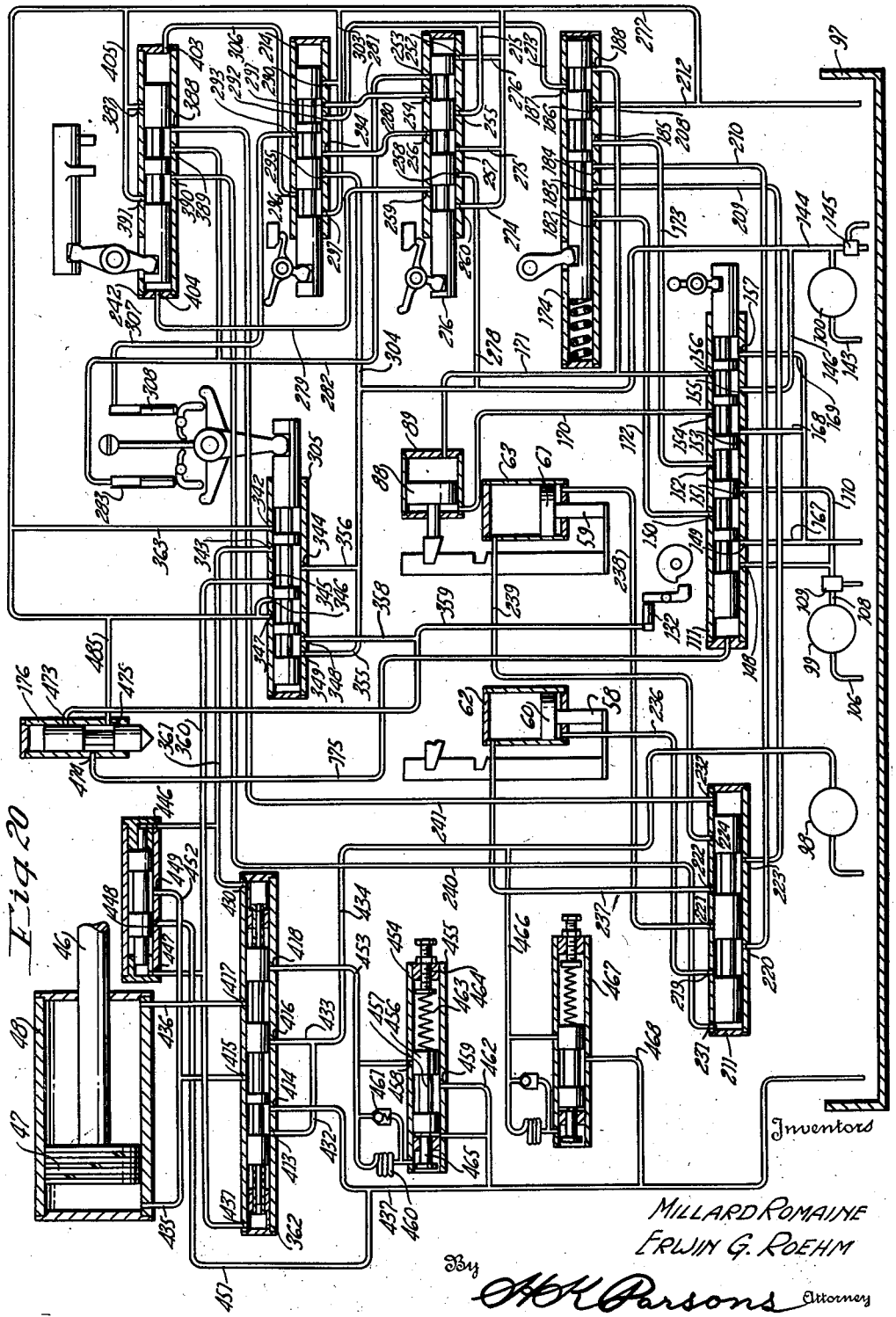

Patented Dec. 17, 1935

2,024,253

UNITED STATES PATENT OFFICE 2,024,253

BROACHING MACHINE

Millard Romaine, Cincinnati, and Erwin G. Roehm, Norwood, Ohio, assignors to The Cincinnati Milling Machine Co., Cincinnati, Ohio, a corporation of Ohio Application August 10, 1934, Serial No. 739,222

20 Claims. (Cl. 90—33)

REISSUED

This invention relates to improvements in machine tools and particularly to broaching machines.

An object of the invention is the provision of an improved surface broach adapted to operate on relatively large surfaces and produce work pieces in a minimum of time.

Another object of the invention is the provision of a broaching machine of the type above specified in which a plurality of work supporting tables are employed for thereby increasing the output of the machine since the work of one table may be operated upon while the second table is being loaded.

Another object of the invention is the provision of means for varying the length of stroke of the broaching tool, depending upon which table will be next in operative position, thereby cutting down the time that would be consumed by actuating the broaching tools at a slow cutting rate until the work on the next table is engaged.

A further object of the invention is the provision of automatic means for effecting and controlling the movement of the broach ram and the movements of the different tables whereby said movements are fully interlocked and operate in timed sequential order and with a minimum of lost time.

A still further object of the invention is the provision of improved hydraulically actuated and controlled means for effecting the cyclic, automatic operation of the parts as specified in the foregoing paragraph.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 1 is a front elevational view of the broaching machine embodying this invention.

Figure 2 is a top plan view of the machine shown in Figure 1.

Figure 3 is an end elevational view of the machine as seen substantially from the right hand end of Figures 1 and 2.

Figure 4 is a transverse sectional view through the machine as seen substantially from line 4—4 on Figure 2.

Figure 5 is a fragmentary rear elevational view shown partly in section and illustrating the table locking mechanism.

Figure 6 is an enlarged view partly in section and partly in elevation, illustrating the valve operated by the table locking means.

Figure 7 is a sectional view taken substantially on line 7—7 of Figure 1.

Figure 8 is a fragmentary view as seen from line 8—8 on Figure 4.

Figure 9 is an elevational view of the left hand end of Figure 8 as seen from line 9—9 thereon.

Figure 10 is a sectional view illustrating the manually operating lever taken on line 10—10 of Figure 1.

Figure 11 is a sectional view through the ram controlled valve as seen from line 11—11 on Figure 4.

Figure 12 is a view partly in section and partly in elevation as seen substantially from line 12—12 on Figure 4.

Figure 13 is a sectional view taken on line 13—13 on Figure 4.

Figure 14 is a sectional view taken on line 14—14 of Figure 13.

Figure 15 is a sectional view taken on line 15—15 of Figure 13.

Figure 16 is an enlarged view taken substantially on line 16—16 on Figure 13.

Figure 17 is a sectional view taken on line 17—17 on Figure 8.

Figure 18 is a sectional view on line 18—18 of Figure 8.

Figure 19 is a sectional view through a pressure actuated valve forming a detail of the invention.

Figure 20 is a diagrammatical view diagrammatically showing the entire circuit involved in the invention.

Figure 21 is a sectional view taken on line 21—21 of Figure 12.

Throughout the several views of the drawings similar reference characters are employed to denote the same or similar parts.

As was above noted, this invention pertains to improvements in a broaching machine in which the work supporting tables are movable to place work thereon in the line of movement of the broach tool. From this it will be noted that the said parts move in paths at right angles to one another. The said broach and tables are supported by a suitable frame or bed unit which may be of any suitable or desirable configuration and either of castings or fabricated.

As shown in the drawings the bed is of fabricated construction, that is, welded of steel sheets and the like. Accordingly, and with reference particularly to Figure 4, the bed comprises a base plate 20 to which is secured channel irons 21 forming the main support for the superstructure for the broach ram. Welded to the channel irons is the bed plate 22 to which in turn is secured a plurality of ribs 23 forming between them pockets or spaces in which the several control mechanisms, such as valves and the like, are disposed. On top of the rib plates 23 is a top plate 24 forming a support for the electric motor or prime mover 26 which effects the rotation of the pumps which circulates the hydraulic medium utilized in the operation of the machine as will later be made clear.

The forward edges of the rib plates 23 have secured thereto a face plate 27, here shown as of I-beam construction, with the flanges thereof secured to the upper surface of the bed plate 22 and the under surface of the top plate 24. The face plate 27 in turn has secured to its forward surface spacers 28 to which are secured the ways or guides 29 and 30. The rear edges of the rib plates 23 have welded or secured thereto the rear plate 31, also supporting some of the controlling mechanisms and bearings for rotating shafts and the like, all of which will be described in detail later.

Secured to the forward supporting channel iron 21 is a plate 32 to which is welded or otherwise secured a pair of table supporting mechanisms, each being a duplicate of the other and since there is only one of them illustrated in detail it is believed that a description thereof will suffice for both. The table supporting mechanism, therefore, comprises a base plate 33 and a top plate 35 between which are welded or otherwise secured vertical supports 34. The top plate 35 has secured thereto the guides 36 and 37, see Figure 1, which support the work supporting table and guide same during its movement toward and from the main bed or broach supporting mechanism.

Mounted for movement relative to the broach ways 29 and 30 is the ram 38 having guide portions 39 and 40 which respectively engage with the guides 29 and 30. The ram 38 is held against said guides 29 and 30 by means of gibs 41 and 42 which in effect clamp the guides 39 and 40 between themselves and the guide ways 29 and 30. The ram 38 is provided in its forward face with a plurality of T slots 43 in which are disposed T bolts 26 for securing the broaching tools 44 thereto. The ram 38 is adapted to be hydraulically actuated for which purpose it has secured, in any desirable manner, to its one end a plate 45, see Figure 3, having an aperture therein through which the free end of a piston rod 46 passes. The other end of the piston rod 46 has secured thereto a piston 47, see Figure 20, which is disposed in a cylinder 48. Opposite ends of the cylinder are closed by suitable heads 49 and 50, the latter including a stuffing box which surrounds the piston rod 46 to prevent escape of the hydraulic medium from the cylinder 48. The hydraulic circuit for effecting the operation of the piston is illustrated in Figure 20 and will later be described in detail.

Mounted on each pair of table guides 36 and 37 is a work supporting table 51 and 51A each having guide ways 52 and 53 which contact with the guides 36 and 37 and are held against one another by gibs 54. Each of the tables 51 is provided in its upper surface with T slots 55 which are adapted to receive T bolts for securing thereto suitable work fixtures and work pieces shown in the drawings in phantom lines and indicated by the reference character 56.

Each of the tables 51 and 51A is adapted to be actuated by hydraulic means, for which purpose they have secured to their forward ends in any desirable manner a bracket 57 respectively receiving the free ends of piston rods 58 and 59 shown in Figure 20. The inner ends of said rods have respectively secured thereto pistons 60 and 61, each enclosed in a separate cylinder 62 and 63. Since the physical structure of each of said piston and cylinder mechanisms and its mounting is the same, but one of them will be described in detail as illustrated in Figure 4. Accordingly, the cylinder 63 is provided at opposite ends with cylinder heads 64 and 65, the latter of which includes a stuffing box to prevent escape of the hydraulic medium from the cylinder around the piston rod projecting therethrough. The hydraulic circuit for effecting the operation of the pistons 60 and 61, and therefore the tables 51 and 51A, is shown in Figure 20 and will be described in detail later.

Passing through each of the work tables and bed is a pair of adjusting screws and lock bars 66, 67, 68, and 69; see Figure 5. Each of said bars is provided at opposite ends of its table with screw threads 70 and 71 on which is respectively provided nuts 72 and 73. In order to vary the position of either table or change the zone through which the table moves, the nuts on each screw at the desired end thereof is backed away or loosened, whereupon the nuts at the other end of the table are moved to effect the movement of the table into engagement with the nuts previously loosened.

In order to lock the tables at the ends of their movements as effected by the pistons 60 and 61, the rear ends of each of the bars 66, 67, 68 and 69 is provided with a pair of wedge-shaped notches 74 and 75 into which wedges 76, 77, 78 and 79 are moved, it being noted that there is an independent wedge for each bar. The wedges 76 and 77 are carried by a carrier 80, while the wedges 78 and 79 are secured to a similar carrier 81. The carriers 80 and 81 are respectively secured to bars 82 and 83 disposed for axial movement respectively in bearings 84 and 85 carried by the rear end of the bed and the said bars 82 and 83 are connected together for simultaneous movement by a cross head 86. The cross head 86 is secured substantially midway of its length to a piston rod 87. The upper or free end of the rod 87 has secured thereto a piston 88 enclosed within a cylinder 89 between cylinder heads 90 and 91. The cylinder head 91 includes a stuffing box which surrounds the piston rod 87 and, in addition, provides a bracket whereby the piston and cylinder is secured to the rear plate 31 of the bed. The hydraulic circuit for actuating the piston 88 is clearly illustrated in Figure 20 and will be described in detail later.

The adjusting screws and lock bars 66, 67, 68 and 69 are each supported at their rear ends by means of half bearings 92, 93, 94 and 95 integral with or secured to individual brackets 96. The brackets 96 are bolted or otherwise secured to the rear angle iron 21 of the base structure and these structures, and therefore the base of the machine, are positioned directly beneath the several locking wedges 76 and 79 inclusive to take the thrust incident thereto.

Referring now to Figure 20 the hydraulic circuit will be described and the control valves will be likewise fully described as they are encountered in the circuit. Disposed within the bed of base of the machine is a tank indicated in Figure 20 by the numeral 97 which contains the hydraulic medium, preferably oil, to be circulated through the system. Supported by the bed and conveniently by the inner plate 31 is a plurality of pumps 98, 99 and 100, each being driven by the motor or prime mover 25 secured to the top plate of the machine. For this purpose the motor 25 has associated therewith a pulley or sheave 101, shown in the drawings as of the multiple groove type, and about which is trained a plurality of flexible transmission members or V belts 102. As seen in Figure 2 the belts 102 in turn are trained about a multiple groove, sheave or pulley 103 on a shaft 104. Connected to this shaft 104 are the rotors of the pumps 98, 99 and 100. The shaft 104 is rotatably journaled in bearings 105 carried by the rear plate 31.

The pump 99 is utilized for effecting the cross movement of the work tables and has projecting from one side thereof a suction pipe 106 which terminates in the sump or tank 97 and has extending from its other side a pressure pipe or conduit 108 through which the medium is discharged by the pump under pressure. Disposed within the pressure pipe 108 is a relief valve 109 which determines the ultimate pressure for actuating the work supporting tables. Extending from the main pressure conduit 108 is a branch conduit 110, which, together with the conduit 108, terminates in a control valve 111. The valve 111 is the main control valve and is adapted to initiate and stop the cycle of the machine, the valve being shown structurally in Figures 2, 4, 8, 9 and 17.

As shown in Figure 4, the valve comprises a housing 112 secured to one of the rib plates 23, preferably near the center of the length of the bed. The valve is adapted to be manually actuated for which purpose it has projecting through the casing 112 a rod 113 having integral therewith or secured thereto at the upper end a short rack 114. The rack 114 is slideable through a bracket 115 and meshes with a pinion 116 enclosed within said bracket 115. The pinion 116 is keyed or otherwise secured to a shaft 117 journaled in the bracket 115 and in a second bracket 118, see Figure 2. The bracket 118 contains a pair of right angle mitre gears 119 which are respectively secured to the shaft 117 and a second shaft 120 which terminates in a bracket 121. Within the bracket 121 the shaft 120 has a rack and pinion connection with a lever 122 exteriorly of the said bracket.

From the foregoing it will be seen that actuation of the lever 122 toward or from the operator, as seen in Figure 1, will effect a vertical shifting of the rod 113. As seen in Figure 17 the rod 113 within the valve casing 112 is provided with a notch 123 receiving the ball end 124 of a valve shifter member 125 keyed or otherwise secured to a shaft 126 oscillatably journaled in bearings provided by the housing 112. The valve shifter 124 has projecting from its other side an arm 127, the free or ball end of which is received in a notch 128 of a latch or locking member 129, whereby the actuation of the valve mechanism 111 is normally prohibited. The latch member 129 is pivotally mounted at 130 to a lug integral with the housing 112 and the other or free end of the latch 129 is engaged on opposite sides by a spring pressed plunger 131 and an hydraulically actuated piston plunger 132, the former plunger shifting the latch to a locking position and the latter releasing the latch so that the valve mechanism 112 may be actuated.

Keyed or otherwise secured to the shaft 126 intermediate its ends is a plate 133 having formed therein notches 134, 135 and 136 which cooperate with a pivotally mounted dog 137. A spring 138 is provided to maintain contact between the dog 137 and plate 133, one which also functions to cause the dog 137 and plate 133 to act as a spring loaded load and firing mechanism. Near the forward end of the shaft 126, as seen in Figure 17, it has keyed or otherwise secured to it, a valve shifter finger 139 having its free end disposed within a notch 140 formed in the valve stem 141 of a valve member 142. From the foregoing it will be noted that the oscillation of the shaft 126 as effected by the lever 122 actuates the valve member 142 of the valve mechanism 111 to initiate the movement of one of the work supporting tables 51, as will later be made clear. This movement of the table is arrested by automatically shifting the valve member 142 to its initial or cut-off position by means to be later described.

The valve mechanism 111, in addition to initiating the movement of the work table, effects the operation of the table locking piston and cylinder mechanism 88 and 89. The power for actuating this wedge lock piston and cylinder mechanism is derived from the pilot pump 100, which as shown in Figure 20 has projecting from one side thereof the suction pipe 143 which terminates in the sump or tank 97. Extending from the other side of the pump 100 is the pressure pipe or conduit 144 containing a relief valve 145 which determines the maximum pressure in the pipe 144. Extending from the pipe 144 is a branch pipe or conduit 146 terminating in the main control valve 111.

The valve mechanism 111 includes the valve member 142 which is disposed for sliding movement in the bore of a valve bushing 147 pressed into a bore in the valve casing 112. The bushing 147 has formed therethrough a plurality of sets of radial ports 148, 149, 150, 151, 152, 153, 154, 155, 156 and 157, each set of ports being connected together by a similar circumferential groove 158 formed in the exterior of the bushing 147. The valve member 142 is provided with a plurality of collar or piston portions forming between them reduced portions or cannelures 159, 160, 161, 162 and 163 which connect the sets of radial ports in different combinations, depending upon the position of the valve member 142. The bore through the bushing at the right hand end is closed by a plug 164 through which is formed a port 165 whereby communication is had to a chamber 166 formed between the inner end of the plug 164 and opposed end of the valve member 142. The position of the valve member is determined by the notches 134, 135 and 136 formed in the plate 133 above described. From this it will be seen that the valve member 142 has three operative positions, the central or neutral one shown in the drawings and an operative position on either side thereof. The means for shifting the valve 142 was above described and includes the handle or lever 122.

As will be seen from Figure 20, the ports 148 and 151 have connected therewith the main and branch pressure pipes or conduits 108 and 110 from the pump 99, while the ports 155 have connected therewith the terminal of the branch pressure pipe or conduit 146 from the pump 100.

The ports 149, 153 and 157 have respectively connected therewith branch discharge ports or conduits 167, 168 and 169 which terminate in the sump or tank 97. The ports 154 and 156 have respectively connected therewith one terminus of pipes or conduits 170 and 171, in turn respectively connecting with the left and right hand ends of the wedge cylinder 89. The ports 150 and 152 have respectively connected therewith one terminus of a pipe or conduit 172 and 173, terminating at their other ends in a valve mechanism indicated generally in Figure 20 by the reference numeral 174 and which valve mechanism is operated by the wedge pistons 88 at opposite ends of its movement. The remaining port to the valve bushing 165 formed in the plug 164 has connected therewith one end of a pipe or conduit 175 terminating at its other end in a ram operated plunger valve indicated generally in Figure 20 by the reference numeral 176.

With the ports in the positions shown in the drawings and assuming that both work supporting tables 51 and 51A are in a retracted position with an unfinished work piece mounted on the left hand table 51A, as seen in Figures 1 and 2, and ready to have a broaching cut performed thereon, the handle 122 is therefore actuated and since this handle is a directional handle for indicating the direction of movement of the tables it will be actuated away from the operator or toward the main bed. The lever 122, as seen in Figure 20, will therefore be actuated in a clockwise direction for shifting the valve member 142 to the left. This movement is permitted because, see Figure 17, the locking arm 127 is disposed in the notch 128 with clearance behind it to permit this movement.

At this time the main pressure conduit 108 is blocked off while the branch pressure conduit 110 is connected with the pipe or conduit 173, but flow therethrough is blocked by the valve mechanism 174. Also the pressure pipe 146 from the pump 100 is connected with the pipe or conduit 170 to the left hand end of the cylinder 89 as seen in Figure 20, or the lower end of said cylinder as seen in Figure 5. This will cause the piston 88 to be actuated to the right as seen in Figure 20 or upwardly, as seen in Figure 5, and withdraw the several wedges 76 to 79 inclusive from the outer wedge notches 75 in which it is assumed they were prior to this time seated. Near the upper end of the movement of the piston 88 it effects the operation of the valve mechanism 174 through the means disclosed in Figures 5 and 6.

The means for actuating the valve mechanism 174, as shown in the two last named figures, comprises a rod 177 depending conveniently from the carrier 81 and in fact may be a continuation of the rod 83 extending through said carrier, the lower end of said rod 177 being threaded to adjustably take lock nuts 178 and 179. Secured to the plate 21 behind the rod 177 is the valve mechanism 174 which comprises a housing 180 containing the said valve mechanism and the means for effecting its operation under the control of the lock nuts 178 and 179.

This valve mechanism 174 comprises a valve bushing 181 pressed into a suitable bore in the housing 180 through which is formed a plurality of ports 182, 183, 184, 185, 186, 187 and 188, each set of ports being encircled by a similar circumferential groove 189 formed in the exterior of the bushing. Disposed within the bushing is a slidable valve member 190 having formed thereon a plurality of spool or piston portions between which are reduced portions or cannelures 191, 192 and 193 adapted to connect the ports in different combinations, depending upon the position thereof.

The valve member 190 has two positions, that shown in the drawings and a second position to the left thereof. In order to shift the valve to its second position it has connected therewith one end of a valve stem 194 in which is formed a notch 195 receiving the ball end 196 of a lever or arm 197 keyed or otherwise secured to a shaft 198 oscillatably journaled in bearings provided by the housing 180. The arm 197 is secured to the shaft 198 interiorly of the housing 180 and the said shaft projects beyond said housing to receive a second arm 199. The arm 199 has its free or ball end 200 disposed in the path of movement of the upper lock nuts 179 as effected by the movement of the piston 88. Ahead of the arm 199 the shaft 198, as seen in Figure 6, has secured thereto a second arm 201 having one end 202 thereof overlying a spring pressed plunger 203 and having formed on its other end a nose 204. The nose 204 lies adjacent a pivotally mounted latch member 205. The latch 205 has contacting therewith on one side of its pivot a spring pressed plunger 206 which tends at all times to shift the latch into locking engagement with respect to the nose 204. The latch 205 on the side opposite to that engaged by the plunger 206 is provided with a cam face 207 cooperating with the lower lock nuts 178 in order to effect a release of the latch member 205.

With the parts in the position shown in Figures 5 and 6, and the piston 88 being actuated upwardly as above described the operation is as follows: when the piston 88 reaches the upper or outer limit of its travel the wedges 76 to 79 inclusive are fully retracted, whereupon the tables are unlocked and may be actuated. Just prior to reaching the said upper end of its stroke the lock nuts 179 engage the arm 199 and actuate the shaft 201 in a clockwise direction, thereby correspondingly actuating the valve shifter arm 197 and the plunger arm 201. Simultaneously, the lower lock nuts 178 free the latch 205 so that it may fall beneath the plunger arm 201 as soon as the valve member 190 is shifted. During this movement of the parts the plunger 203 is actuated to load its spring and the said plunger is held under tension by the latch 205. From the foregoing it will now be seen how the valve mechanism 174 is shifted to its second operative position which at this time actually effects the movement of the work table 51A. As seen in Figure 20, the ports 182 and 185 have connected therewith the pipes or conduits 172 and 173 extending from the valve mechanism 111, while the ports 188 have connected therewith one end of a pipe or conduit 208 which extends from the pipe or conduit 171 between the cylinder 89 and valve mechanism 111. The ports 183 and 184 have respectively connected therewith one end of a pipe or conduit 209 and 210 which terminate at their other ends in a selector valve mechanism indicated generally in Figure 20 by the reference numeral 211, and it should be noted at this time that the valve mechanism 211 is utilized for determining which of the work supporting tables 51 or 51A is to be actuated. The ports 186 have connected therewith one end of a pipe or conduit 212 which terminates in the sump or tank 97, while the remaining ports 187 have connected therewith one end of a pipe or conduit 213 which, as shown in Figure 20, terminates at a valve mechanism indicated generally in Figure 20 by the numeral 214 and through a branch conduit 215 terminates in a valve mechanism indicated generally by the reference numeral 216. The valve mechanisms 214 and 216 are operated respectively by the tables 51 and 51A at each end of the table stroke.

Upon the shifting of the valve member 190 of the valve mechanism 174 to its left hand or second operative position the pipe or conduit 173 to which the pressure was connected by the valve mechanism 111 is now connected with the pipe 210 to the selector valve mechanism 211. This valve mechanism 211 is shown structurally in Figure 19 and will now be described in detail.

Accordingly, and as seen in Figure 19, this valve mechanism comprises a valve casing 217 into which is pressed a valve bushing 218 having formed therethrough a plurality of sets of radial ports 219, 220, 221, 222, 223 and 224, each set being encircled by a similar circumferential groove 225 formed in the exterior of the bushing 218. Disposed within the bore in the bushing 218 is a valve member 226 having formed thereon a plurality of collars or piston portions forming between them cannelures 227 and 228 for connecting the radial ports with one another in different combinations. The ends of the bore through the bushing 218 are closed by plugs 229 and 230, each having formed respectively therein a port 231 and 232. The valve member 226 has two operative positions, one as shown in Figure 20 and the other as shown in Figure 19. In order to position the valve member and hold same in either of its two positions one of the collars or piston portions thereof is provided with a pair of V shaped notches 233 and 234 adapted to receive the pointed or cam end of a spring pressed plunger 235 carried by the housing 217.

As seen in Figure 20, the ports 220 and 223 of the bushing 218 have respectively connected therewith the pipes or conduits 210 and 209 extending from the valve mechanism 174. The ports 219 and 222 have respectively connected therewith one end of a pipe or conduit 236 and 237 which respectively terminate at the lower and upper ends of the cylinder 62, as seen in Figure 20, while the ports 221 and 224 have respectively connected therewith one end of pipes or conduits 238 and 239 terminating at their other ends in the lower and upper ends of the cylinder 63, also as seen in Figure 20. The ends for plug ports 231 and 232 have respectively connected therewith one end of pipes or conduits 240 and 241 terminating at their other ends in the dog selecting piston-valve mechanism indicated in general in Figure 20 by the reference character 242.

With the valve member 226 of the valve mechanism 211 in the position shown in Figure 20 the pressure in the pipe or conduit 210 is connected into the pipe or conduit 236 for actuating the piston 60 and shifting the table 51A toward the ram or to the position of table 51 shown in Figure 4. The movement of this table carries with it, of course, the adjusting screws and lock bars 68 and 69, the former of which carries a dog rail 243A which in longitudinal section is similar to the dog rail 243 on the bar 66 shown in Figure 4. The dog rail 243A is therefore provided with a T slot for adjustably securing thereto dogs 244A and 245A. The dogs 244A and 245A are adapted to ultimately reversely oscillate a flipper dog 246 secured to one end of a shaft 247. The shaft 247 is rotatably or oscillatably journaled in bearings provided by a housing 248 and a sleeve 249, in turn oscillatably journaled in a housing 250. As seen in Figure 8, the housings 248 and 250 are secured to opposite faces of spaced partitions 23, this being due to the fact that the tables, which are necessarily of considerable width, are considerably spaced from one another. The purpose for the oscillation of the shaft 247 is two-fold: first, to shift the valve mechanism 216, and second, to return the valve mechanism 111 to its central or neutral position. The operation of the valve mechanism 216 will first be described, following which the reason and purpose for shifting the valve mechanism 111 will be described.

The valve mechanism 216 is shown structurally in Figure 18 and includes the housing 248 which in effect is a valve casing having pressed therein a valve bushing 251, having formed therethrough a plurality of sets of radial ports 252, 253, 254, 255, 256, 257, 258, 259 and 260, each set of ports being encircled by a similar circumferential groove 261. Disposed within the bore in the bushing 251 is a valve member 262 having formed thereon a plurality of piston portions to provide therebetween cannelures 263, 264, and 265 for connecting together the separate ports in the bushing in different combinations, depending upon the position of the valve member 262.

The valve member 262 has two operative positions, one as shown in the drawings and the other to the right of the position shown in Figure 20. In order to position the valve member it has projecting therefrom a stem 266 in which is formed a notch 267 receiving the ball end 268 of a shifter arm 269 keyed or otherwise secured to the oscillatable shaft 247. In order to accurately position the valve 262, the shaft 247 has keyed or otherwise secured to it a plate 270 in which is formed notches 271 and 272 cooperating with a spring loaded detent arm 273. Additionally, the arms 273 and 270 act as a load and fire mechanism for insuring the shifting of the valve member 262 beyond the dead center position.

As seen in Figure 20, the ports 255 have connected therewith the terminus of the pipe or conduit 215 extending from the pipe or conduit 213, while the ports 260, 257 and 252 have respectively connected therewith one end of branch discharge conduits 274, 275 and 276 each emptying into a pipe or conduit 277, in turn connecting with the discharge conduit 212 and the sump or tank 97. The ports 258 have connected therewith one end of a pipe or conduit 278 extending from the pressure conduit 144 from the pump 100. The ports 259 have connected therewith a pipe or conduit 279 which terminates at its other end in the dog selecting piston-valve mechanism 242. The ports 256 and 254 have respectively connected therewith one end of a pipe or conduit 280 and 281, terminating at their other ends in the valve mechanism 214, while the remaining ports 253 have connected therewith one end of a pipe or conduit 282 terminating at its other end in an hydraulic plunger mechanism 283 utilized for shifting the ram pilot valve. It will be appreciated that the shifting of the valve member 262 by the dog 244a to its second operative position effects a different set-up through the valve mechanism 216 and the purpose thereof will be described later.

The means for simultaneously shifting the valve member 142 of the valve mechanism 111 to its central or neutral position is shown in Figures 8 and 9 and will now be described in detail. Secured to the oscillatable shaft 247 at its other end is a post 525 having formed at its upper end a pin 526 which passes through a flared aperture 527 formed through a ball 528 disposed centrally of a connecting rod 530. Adapted to cooperate with the ball 528 is an arm 529 integral with and depending from a sleeve 287 pinned or otherwise secured to the shaft 126 which projects beyond the housing or valve casing 112 and on which is fastened the valve shifter arm 139.

The post 525 and the ball 528 are normally, that is, when the machine is not running, in the position shown in Figure 9 with relation to the depending arm 529. When the valve member 142 was initially or manually shifted the arm 529 was actuated in a clockwise direction, thereby bringing the face 533 on the arm 529 adjacent the ball 528. The operation of the valve mechanism 216 through one of the dogs 244a or 245a oscillates the shaft 247 in a clockwise direction carrying with it the post 525. Since the arm 529 is lying adjacent the ball 528 this movement of the post 525 and therefore the ball 528 causes the latter to engage the arm face 533 to actuate same in a counterclockwise direction about the axis of the shaft 126 and thereby shift the valve member 142 to its neutral position.

In addition to the post 525, the shaft 247 has secured thereto an arm 284 from one face of which projects a pin 285. As will later be made clear, the pin 285 is adapted to engage a face 288 formed on an arm 286 integral with and depending from the sleeve 287. The arm 284 is provided with a cylindrical aperture 531 receiving the ball end 532 of the connecting rod 530 which acts as a guide for said rod upon movement of either the post 525 or the arm 284.

The arm 284 through its pin 285 and the arm 286 are employed to return the valve motor 142 to its neutral position after it has been reversely actuated to return the work table from its operative to its inoperative or loading position, and thereby dispose the parts in their normal relationship above described.

The shifting of the valve member 142 to its neutral position cuts off the flow from the pipe or conduit 110 to the pipe or conduit 173 and therefore stops the movement of the table 51a toward the broach ram. At the same time the flow of pressure through the pipe 146 is disconnected from the pipe or conduit 170 and connected with the pipe or conduit 171 for thereby shifting the piston 88 downwardly to cause the locking wedges to enter the grooves in the lock bars and finally position the work supporting table. At the same time that the pressure is introduced into the pipe or conduit 171 it flows into the branch conduit 208 to the valve mechanism 174. It will be remembered that the valve member 190 of this valve mechanism is in its second operative position, that to the left of that shown in Figure 20. At this time then the pipe or conduit 208 is closed and no flow is had therethrough. However, as soon as the piston 88 is in its lowermost position the lower lock nuts 178 engage the latch cam 207 to permit the spring plunger 203 to shift the valve member to the position shown in Figure 20 and thereby establish a connection between the pipe or conduit 208 and the pipe or conduit 213.

Since the table 51A is now at its innermost position the valve member 262 will be in its second operative position, that is, to the right of the position shown in Figure 20. This would connect the conduit 213 through which pressure is now flowing through the pipe or conduit 215 with the pipe or conduit 280 and therefore the valve mechanism 214. Since the valve mechanism 214 is utilized in the continued flow of the medium it will now be described in detail, it being shown structurally in Figure 17.

As shown in Figure 17, the valve mechanism 214 includes a housing or casing which is the housing above referred to through which the oscillatable shaft 247 passes and was given reference numeral 250. The housing 250 has therefore pressed into it a bushing 289 through which is formed a plurality of sets of radial ports 290, 291, 292, 293, 294, 295, 296, and 297, each set being connected by a similar circumferential groove 298, one in the exterior of the bushing 289. Disposed within the bore in the bushing 289 is a valve member 299 having formed thereon a plurality of collars or piston portions between which is formed reduced portions or cannelures 300, 301 and 302 for connecting the radial ports in different combinations, depending upon the position of the valve 299.

By reference to Figure 20 it will be seen that the ports 294 have connected therewith the pipe or conduit 280 while the ports 291 have connected therewith the pipe or conduit 281 also extending from the valve mechanism 216. The ports 290 and 297 have connected therewith branch discharge conduits which empty into a conduit 303, in turn emptying into the conduits 277 and 212 and the sump or tank 97. The ports 292 have connected therewith the pipe or conduit 213 which extends from the valve mechanism 174. The ports 295 have connected therewith one end of a pipe or conduit 304 which terminates at its other end in the pressure conduit 144 from the pump 100. The remaining ports 296 and 293 have respectively connected therewith one end of pipes or conduits 306 and 307 respectively terminating in the dog selector piston-valve mechanism 242 and an hydraulic plunger 308 which operates on the mechanism for shifting the pilot valve, indicated in Figure 20 by the reference numeral 305, as will later be made clear. Continuing now with the hydraulic circuit and with the valve member 299 of the valve mechanism 214 in the position shown in Figure 20 the pressure flows through pipe 215 to and through pipe 280 where it is connected with the pipe or conduit 307 for actuating the plunger 308. At this time the pressure flowing through the pipe 213 is blocked in the pipe 281 by the valve mechanism 216. Therefore, through the means now to be described the pilot valve 305 is actuated. This means is illustrated in Figure 16 and comprises a casing 309 having formed therein a lug 310 containing cylinders 311 and 312. Disposed within the cylinder 312 is a piston 313 from which the plunger 283 projects, while disposed within the cylinder 311 is a piston 314 from which the plunger 308 projects. Ahead of the pistons 313 and 314 the cylinders 312 and 311 are respectively closed by plugs 315 and 316 through which are formed ports whereby communication is had with the cylinders ahead of the piston. It is with the port in the plug 315 that the pipe or conduit 282 connects while the port in the plug 316 has connected therewith the pipe or conduit 307.

The housing 309 is provided interiorly thereof and in front of the lug 310 with a wall or broach 317 having formed therethrough suitable apertures through which the plungers 283 and 308 project. Surrounding respectively the plungers 283 and 308 is a spring 318 and 319 respectively abutting on one end with pistons 313 and 314 and on the other end with the wall or broach 317. The springs 318 and 319 tend to retract their plungers against the force of the hydraulic pressure acting on their pistons, that is, upon release of the pressure on the pistons the plungers are returned to their normal positions by the springs. Secured to the inner end of the plunger 283 is a cam plate 320, while the plunger 308 has secured to its inner end a similar cam plate 321. The cam plates 320 and 321 are adapted respectively to engage latches 322 and 323 to render same inoperative. For this reason the said latches are independently pivotally mounted within the housing 309 and have respectively connected therewith springs 324 and 325 for normally shifting same to an operative or latching position, which is that shown in Figure 16. The inner or opposite faces of the latch arms 322 and 323 are respectively provided with a shoulder 326 and 327 cooperating with similar shoulders on winged plate 328 keyed or otherwise secured to a shaft 329. As will later be described, the shaft 329 has also keyed thereon a valve shifter arm and a lever whereby under certain conditions the shaft may be manually actuated. The conditions under which the shaft 329 may be manually operated will later be made clear. The plate 328 has its wings 330 and 331 disposed respectively beneath the plungers 283 and 308.

From the foregoing it will be noted that upon actuation of either of the pistons 313 or 314 the plunger connected therewith will be correspondingly moved. The movement of this plunger through its cam plate first renders the latch inoperative, whereupon the released wing of the plate 328 is engaged and actuated by the plunger. This then effects an oscillation of the said plate 328 and the shaft 329. As above described, and with the parts in the position to which they were shifted by the movement of the table 308 the pressure is flowing through the conduit 307 acting on the piston 314 and shifting the plunger 308. This renders the latch 323 inoperative and effects the clockwise oscillation of the plate 328 and shaft 329.

The valve shifter arm is shown in Figure 14 and indicated by the reference character 332, and as will there be noted, is disposed ahead of the winged plate 328. The ball end 333 of the lever 332 is disposed in a notch 334 formed in the pilot valve member 335. The pilot valve member 335 has three operative positions, that shown in the drawings and an operative position on either side thereof, the positions of the valve being determined by notches 336, 337 and 338 formed in the upper surface of the lever 332 which cooperates with the nose of a spring pressed detent or dog 339.

The valve member 335 is disposed in a valve bushing 340 pressed into a valve casing 341 disposed within the housing 309. The bushing 340 is provided with a plurality of radial ports 342, 343, 344, 345, 346, 347, 348 and 349, each set of ports being encircled by a similar circumferential groove 350. The valve member 335 is provided with a plurality of collars or piston portions forming therebetween reduced portions or cannelures 351, 352, 353 and 354 adapted to connect the radial ports in different combinations, depending upon the position of the valve member.

By reference to Figure 20 it will be seen that ports 349 and 344 have respectively connected therewith pipes or conduits 355 and 356 which are connected with and constitute the terminus of the main pressure line 144 from the pilot pump 100. The ports 348 have connected therewith one terminus of a pipe or conduit 358 which terminates at its other end in a pipe or conduit 359 between the plunger valve mechanism 176 and the latch releasing plunger 132. The ports 347 and 346 have respectively connected therewith branch discharge conduits which are in effect extensions of the main discharge conduit 277, terminating at its other end in the sump or tank 97. The ports 345 and 343 have respectively connected therewith one terminus of a pipe or conduit 360 and 361 terminating at their other ends, as seen in Figure 20, in the left and right hand ends of a reversing valve for the broach ram and indicated generally in Figure 20 by the reference numeral 362. The remaining ports of the bushing 218 has connected therewith one end of a discharge pipe or conduit 363 which empties into the pipe or conduit 277.

From the foregoing it will now be seen that the operation of the valve mechanism 111 initiates the movement to one of the work tables which when it reaches its innermost position automatically locks said table in the inner position and then effects the operation of the reversing valve mechanism 362, which initiates the movement of the broach ram.

During the operation of the pilot valve mechanism 305 the piston valve mechanism 282 was also actuated to position the dogs which automatically stopped the movement of the ram after it has completed its broaching stroke. As was mentioned above, the broach ram moves alternately a greater distance to the right and then to the left, depending upon which table is in operative position and it is for this reason that the proper dogs are selected at the beginning of each operative or broaching stroke. The mechanism 242 and associated mechanism are shown structurally in Figures 12, 13, 15, 16 and 21.

As seen in Figure 4, the ram 38 is provided with a T slot 364 in which is secured four dogs 365, 366, 367 and 368 which are laterally spaced relative to the ram 38. The said dogs are operable in pairs, the dogs 365 and 367 acting at one time and the dogs 366 and 368 at the other time. In addition, to be laterally spaced the dogs 365 and 368 inclusive are longitudinally spaced relative to the ram, as seen in Figure 1.

The dogs 365 to 368 inclusive are adapted to operate on the flipper dog 369 shown in Figures 12 and 21. The flipper dog 369 has a pair of laterally spaced wings 370 and 371 connected to one another by bridge piece 372. The ram dogs 367 and 368 operate on the wing 371 while the ram dogs 365 and 366 operate on the wing 370. The dog mechanism 369 is splined to a shaft 373 rotatably mounted in a bracket 374 carried by the main bed and in the bracket 399. Additionally, the dog mechanism 369 is provided with a slot 375 receiving a pin 376 carried by a link 377. The link 377 is keyed or otherwise secured to a vertical shaft 378 oscillatably mounted in bearings provided by the housing 309. The oscillatable vertical shaft 378 has keyed to its upper end a lever 379, see Figure 15. The lever 379 has its ball end 380, see Figure 13, received in a notch 381 in a slide rod 382 disposed for sliding movement in suitable bearings provided by the housing 309. Projecting from the rod 382 is a lug 383 which connects the flipper dog mechanism with the piston valve mechanism 242.

As seen in Figure 13, the lug 383 is in the nature of a plate disposed in a notch 384 in the valve member 385 of the piston valve mechanism 242. This piston valve member 385 is disposed in a cylinder or bushing 386 which is pressed into the housing 309. The bushing 386 has formed therethrough a plurality of sets of radial ports 387, 388, 389, 390 and 391, each set being encircled by a similar circumferential groove 392 formed in the exterior of the bushing 386. The piston valve member 385 is provided with a pair of undercut portions or cannelures 393 and 394 adapted to connect the radial ports in the bushing in different combinations, depending upon the position of the piston valve member 385.

This piston valve member 385 has two operative positions, one as shown in Figure 20 and the other as shown in Figure 13. In order to accurately position the valve the shifter arm 379 therefore is provided with a plate extension 395 in which is formed notches 396 and 397 cooperating with the noxe 398 of a lever or detent 399. A spring 400 is provided having one end anchored within the housing 309 and the other end connected with the detent 399 to maintain engagement between the detent nose 399 and the lever plate 395.

The piston valve member 385 is adapted to be shifted by hydraulic pressure to its operative positions for which purpose the bushing 386 is closed at opposite ends by plugs 401 and 402 through which is respectively formed ports 403 and 404 to afford communication to the cylinder bushing at the ends of the piston valve member 385.

By reference to Figure 20 it will be seen that the plug ports 403 and 404 have respectively connected therewith the other ends of the pipes or conduits 306 and 279, respectively extending from the table valve mechanisms 216 and 214 while the bushing ports 389 have connected therewith one terminus of a pipe or conduit 357 terminating in the pipe or conduit 282. The bushing ports 390 and 388 have respectively connected therewith the other terminus of pipes or conduits 240 and 241 extending from the tables selecting valve mechanism 211. The remaining bushing ports 387 and 368 have connected therewith branch discharge conduits emptying into pipe or conduit 405 connected with the discharge conduit 277 and tank 97.

From the foregoing description it was noted that when the table 51A reached its innermost position it shifted the valve mechanism 216 to its second operative position. The shifting of the valve mechanism 216 connected the pilot pump pressure in pipe or conduit 278 with the pipe or conduit 279 and therefore the left hand end of the piston valve mechanism 242. Under these circumstances the piston valve member 385 is shifted to the position shown in Figure 13, which through the rod 382, lever 379, oscillatable shaft 378, and link 377 shifts the flipper dog mechanism 369 to the position shown in Figure 12 for disposing the flipper dog wing 371 in position to be engaged by the ram dog 361. The shifting of the piston valve member 385 changes the porting connection for effecting the operation of the tables selector valve at a future time as will later be made clear.

The ram reversing valve mechanism 362 is shown structurally in Figure 11 and is made for convenience in two parts, including the reversing valve member 406 and an unloader valve member 407. These valve members 406 and 407 are enclosed in a single casing or housing 408. The reversing valve member 406 is of the sliding piston type adapted to be shifted by hydraulic pressure and the said member is formed with a plurality of piston or spool portions, forming between them cannelures 409, 410 and 411. The valve member 406 is disposed in the bore in a valve bushing 412 which is pressed into a suitable bore in the housing or casing 408. The bushing 412 has formed therethrough a plurality of sets of radial ports 413, 414, 415, 416, 417 and 418, each set being encircled by a similar circumferential groove 419 formed in the exterior of the bushing 412.

In order to hydraulically shift the valve member 406 the ends of the bore through the bushing which close by similar bonnets 420 and 421, each of which provides a bearing for a sleeve 422 and 423, having on their outer ends flange heads 424 and 425. Disposed within the sleeves 424 and 425 is respectively plungers 426 and 427. The bonnets 420 and 421 are respectively closed at their outer ends by plugs 428 and 429 through which is respectively formed ports 430 and 431.

By reference to Figure 20 it will be seen that the radial ports 413 and 416 have respectively connected therewith one terminus of branch pressure conduits 432 and 433 which terminate at their other ends in a pressure conduit 434 which extends from the ram actuating pump 98. The ports 415 and 417 have respectively connected therewith one terminus of pipes or conduits 435 and 436 which respectively terminate at the left and right hand ends of the broach cylinder 48. The ports 414 have connected therewith one end of a pipe or conduit 437 which is the main discharge conduit for the piston and cylinder mechanism 47—48. The remaining bushing ports 418 have connected therewith one terminus of a pipe or conduit 453 which terminates at its other end in a back pressure valve indicated generally in Figure 20 by the reference numeral 454. The plug ports 430 and 431 are respectively connected with the pipes or conduits 361 and 360 extending from the pilot valve mechanism 304.

As was above noted, the unloader valve member 407 is mounted in the same casing 408 as the reversing valve member 406, which was done primarily for convenience since the said valve members may be incorporated in a single member. The valve member 407 is adapted to be pressure actuated the same as the valve member 406 and has formed thereon piston portions, forming therebetween a reduced portion or cannelure 438. In order to pressure shift the valve member 407 it has contacting with the ends thereof piston plungers 439 and 440, each being of a different area in cross section, wherefore equal pressures acting thereon will always shift the valve member to a given position for a purpose that will later be made clear. The plungers 439 and 440 are respectively slidably mounted in bonnets 441 and 442 secured to the ends of a valve bushing 443 in which the valve member 407 is disposed. The ends of the bonnets 441 and 442 are respectively closed by plugs 444 and 445 through which are respectively formed ports 446 and 447.

The unloader valve bushing 443 has formed therethrough a pair of radial ports 448 and 449, each set being encircled by a similar circumferential groove 450 formed in the exterior of the bushing 443.

By reference to Figure 20 it will be seen that the ports 448 have connected therewith one terminus of a pipe or conduit 451 terminating at its other end in the discharge conduit 437. The ports 449 have connected therewith one end of a pipe or conduit 452 which terminates at its other end in the cylinder pipe or conduit 435.

The back pressure valve mechanism 454 is utilized during the cutting stroke of the broach ram to maintain a definite back pressure on the ram to cause a smooth cutting stroke or action and to compensate for any tendency of the broach ram to either lag or run ahead. As shown in Figure 20, this back pressure valve comprises a casing 455 in which is disposed a shiftable spool type valve member 456 in which is formed a reduced portion or cannelure 457. The bushing 455 has formed therethrough ports 458 and 459 which are adapted to be connected through the casing by the valve member cannelure 457. In practice, the ports 456 are more or less choked off, depending upon the resistance offered by the work to insure the broaching tool traveling at a uniform rate during its cutting stroke as above pointed out. In order to position the valve member 456 the casing 455 is connected at one end through a choke coil 460 and one way check valve 461 with the discharge conduit 453. Additionally, the casing 455 has connected with its ports 456 the pipe or conduit 453, while the ports 459 are connected by a pipe or conduit 462 with the discharge conduit 437. Contacting with one end of the valve member 456 is one end of a spring 463 abutting on its other end with an adjustable abutment 464 carried by the valve casing 455. The operation of the back pressure mechanism briefly is as follows:

The flow of pressure through the pipe or conduit 453 is cut off from the pipe or conduit 437 by the valve member 456 but this pressure acting on the piston plunger 465, at the end of the valve member opposite to that of the spring 463, shifts the said valve member against the resistance of the spring 463 for opening the ports 456 to a point depending upon the adjustment of the spring abutment 464 and the normal back pressure. As the back pressure increases, the higher pressure unseats the one way check valve to permit a flow into the casing against the plunger 465 for shifting the valve member 456 and further opening the ports 458, thereby effecting a drop in the pressure in the return line. As this pressure drops there is a corresponding drop in pressure on the plunger 465 whereupon the spring 463 expands to return the valve member to its normal position, forcing the plunger to the left and exhausting the medium ahead of it through the choke coil 460 into the conduit 453 and conduits 462 and 437 in the tank 470.

The ram pump pressure line 434 has connected therewith one terminus of a pipe or conduit 466 which terminates at its other end in a relief valve mechanism 467. It will be noted that the valve mechanism 467 is very similar to the back pressure valve mechanism 454 and it is believed that a specific description thereof is not necessary here. The relief valve mechanism is connected through a pipe or conduit 468 with the return pipe or conduit 437 and the tank 97. As will be appreciated, the relief valve mechanism 467 is utilized for determining the maximum forward pressure that will be developed in the pipe or conduit 434.

Continuing now with the hydraulic circuit it will be remembered that the piston plunger 308 was energized for shifting the valve member of the pivot valve mechanism 305 to the left, thereby cutting off the pressure from the pilot pump in the pipe or conduit 144 from the pipes or conduits 360 and 361 and instead connecting the full pressure in the pipe or conduit 360 only. This pressure, acting on the left hand end of the reversing valve mechanism, shifts same to the right for connecting the pump pressure line 434 through the pipe or conduit 433 with the pipe or conduit 435 and the left hand end of the cylinder 48. The piston 47 is thereby actuated to the right to effect a cutting stroke to the broach relative to the work on the table 51A. Near the end of the cutting stroke the broach effects the operation of the valve mechanism 176 which is shown in detail in Figure 7 and will now be fully described.

As seen in Figure 7, the valve mechanism 176 comprises a casing 469 from which projects an integral arm 470 through which extends a plate 471 for securing the mechanism in position above the broach ram. Pressed into the casing 469 is a valve bushing 472, having formed therethrough a plurality of sets of radial ports 473, 474, and 475, each set of ports being encircled by a similar circumferential groove 476 formed in the exterior of the bushing 472. Disposed within the bore in the bushing 472 is a valve member 477 having formed therein intermediate its ends a reduced portion or cannelure 478 adapted to connect the radial ports when in different operative positions relative thereto. The lower end of the valve member 477 projects beyond the bushing 472 where it is formed with a conical portion or cam point 479. The upper end of the valve member 477 has abutting it one end of a spring 480 which abuts on its other end with a cap or plug 481, closing the upper end of the bore in the bushing 472. A spring 480 tends to urge the valve member 477 downwardly, which movement is limited by a pin 482 projecting from the valve member and disposed in an elongated aperture 483 formed in the bushing 472.

The valve member 477 is moved against the resistance of the spring 480 by a cam plate 484 secured to the upper surface of the broach ram. As was mentioned above, the valve member 477 is moved near the end of the broach stroke, or at least sometime after the movement of the broach has been initiated in a cutting direction. The purpose of this valve will be described shortly.

As seen in Figure 20, the ports 475 have connected therewith one terminus of a pipe or conduit 485 which is connected at its other terminus in the discharge pipe or conduit 277. The ports 474 have connected therewith the other terminus of the pipe or conduit 175 extending from the plug port 165 of the valve mechanism 111. The remaining ports 473 of the bushing 472 have connected therewith the other terminus of the pipe or conduit 359 extending from the latch releasing plunger 132.

When the broach ram reaches the end of its stroke while operating on a piece of work on work table 51A the dog 367 thereof acts on the wing 370 of the flipper dog mechanism 369. This oscillation of the dog mechanism 369 effects the return of the pilot valve member to its neutral position shown in Figure 20 through the following mechanism.

The spline shaft 373 has keyed or otherwise secured to it within the housing 309 a rack pinion 486 which meshes with rack teeth 487 at the lower end of a vertically slideable rack bar 488 carried by the housing 309, see Figures 12 and 15.

The upper end of the rack bore 488 is provided with rack teeth 489 meshing with teeth of a pinion 490, keyed or otherwise secured to the shaft 329 to which is secured the valve shifter arm 333 above described. The movement of this shaft by the dogs, as above described, returns the valve member 335 to the position shown in Figures 14 and 20.

It should be noted at this time that the valve member 335 may be manually shifted to this neutral or central position during the movement of the ram in case of an emergency or to avoid a wreck. Normally, however, the valve is loaded against manual actuation by the latches 322 and 323 cooperating with the winged plate 328 and 329. It will be appreciated that the valve member 335 is manually shifted against the hydraulic pressure acting on the plungers 283 and 308, depending upon in which direction the ram is moving, whether through a cutting stroke or an idle stroke. The manual means just referred to is shown in Figures 1, 2 and 13 and comprises a second rack pinion 491 secured to the shaft 329. The rack pinion 491 meshes with suitable rack teeth formed on rack bar 492 intermediate its ends, the said rack bar being mounted for sliding movement in bearings provided by the housing 309 and additional brackets or housings 493 and 494. As seen in Figure 2, the housings 493 and 494 are respectively disposed on the left hand side of the table 51A and the right hand side of table 51, whereby the operator may control the pilot valve to stop the movement of the ram from the two remote positions relative to the work tables. The housings 493 and 494 include suitable mechanism, such as racks and pinions, for sliding the rod 492 and the said rack and pinion mechanisms have projecting respectively therefrom shafts 495 and 496 to the outer ends of which are respectively secured handles 497 and 498.

The return of the pilot valve member to the neutral position effects the sequential operation of several units, as will now be described. The shifting of the pilot valve member connects the pilot pump through its pressure line 144 and conduit 356 with the reversing valve mechanism lines 360 and 361, thereby directing equal pressures against the ends thereof. This effects the centralization of the reversing valve member and a stopping of the broach ram in a cutting direction. At the same time the pilot valve member connects the pilot pump through the pipe or conduit 144 and pipe or conduit 355 with the pipe or conduits 358 and 359. This first actuates the piston plunger 132 to render the latch 129 inoperative so that the shaft 126, and therefore valve member 142 of control valve mechanism 111, may be reversely actuated. Since, prior to the operation of the pilot valve member by the ram dog 367, the cam plate 488 engaged the plunger valve member 477 for cutting the pipes or conduits 359 and 175. Therefore, as soon as the latch member 129 was rendered inoperative the valve member 142 was shifted to its reverse position from that effected by the handle 122. This position of the valve member 142 is to the right of that shown in Figure 20, which connects the pilot pump through the pipes or conduit 144 and 146 with the pipe or conduit 170 and the left hand end of the wedge lock cylinder 89 for shifting the piston 88 to the right and thereby releasing the tables. At the same time the cross or table actuating pump 99 is connected through the pipe or conduit 110 with the pipe or conduit 172 and the valve mechanism 174. When the piston 88 reaches its unloading position it, through the mechanism described above, at the beginning of the movement of the table 51 again shifts the valve member 190 to its left hand position as seen in Figure 20, thereby connecting the pressure in pipe or conduit 172 with the pipe or conduit 209. The pipe or conduit 209 is connected through the tables selecting valve mechanism 211 with the pipe or conduit 237 and the upper end of the table cylinder 62 for effecting the retraction of the table 51A and its now completed work piece. The table 51A continues to retract until its dog 244A engages the flipper dog 256 and through the shaft 247, and parts carried thereby, shifts the valve mechanism 111 to its neutral position, that shown in Figure 20, and the valve mechanism 216 to the position also shown in Figure 20.

The shifting of the valve mechanism 216 to the position shown in Figure 20 and with the valve mechanism 242 to its right hand side as above described, the following flow of hydraulic pressure takes place. From the pilot pump 100 through the pipes or conduits 144 and 146 control valve mechanism 111, pipes or conduits 171 and 208, valve mechanism 174, pipe or conduit 213, valve mechanism 214, pipe or conduit 281, valve mechanism 216 and pipe or conduit 282 to the piston plunger 283 for operating the pilot valve actuating mechanism and shifting the pilot valve member to the right as seen in Figure 20. The shifting of the pilot valve to its right hand position connects the pilot pump through the pipe or conduit 361 with the reversing valve mechanism 362, thereby connecting the ram and pump with the right hand end of the piston 48. The pressure in the pilot pipe or conduit 361 also shifts the unloader valve member to connect the exhaust or left hand end of the cylinder 48 with the pipe 451, as well as the pipe 437, thereby providing an unrestricted outlet for the fluid being discharged from the cylinder 48.

The hydraulic medium circulated by the pilot pump on flowing through the pipe 282 to the piston plunger 283 also flows through the pipe or conduit 357 to the dog valve mechanism 242 where it is now connected through this valve mechanism 242 with the pipe or conduit 240 and the left hand end tables selecting valve mechanism 211 for shifting said mechanism to its right hand position.

The return or retracting movement of the ram and broach to the right continues until the ram dog 65 engages with flipper dog wing 370 for rotating the flipper dog in a counterclockwise direction as seen in Figure 15. This movement of the flipper dog mechanism correspondingly actuates the spline shaft 373 and pinion 486 secured thereto. The counterclockwise oscillation of the pinion 486 through the rack bar 488 and pinion 490 oscillates the shaft 329 for shifting the pilot valve member 335 through the lever 333 to the position shown in Figure 14 which is also the position shown in Figure 20. This position of the pilot valve member, as seen in Figure 20, connects the pilot pump with both pilot pipes or conduits 360 and 361 to the ram reversing valve mechanism 362 for shifting the said valve mechanism to its neutral or central position and thereby stopping the movement of the broach ram.

At this time both work supporting tables are in their outer position, table 51A having mounted thereon a finished work piece while the table 51 has secured thereto an unfinished work piece which was done during the broaching or tooling of the work piece on table 51A as above described. The cycle of the machine is then repeated by actuating the handle 122; this time, however, actuating the work table 51 toward the broach ram instead of the table 51A.

The handle 122 is therefore engaged to actuate the valve member 142 of the main control valve mechanism 111 to the left as seen in Figure 20, whereupon substantially the same operation ensues, as was above described, when this valve is shifted. It will therefore be appreciated that the tables actuating pump 99 through the pipe or conduit 110 is connected with the valve mechanism 174, while the pilot pump 100 is connected through the pipe or conduit 146, valve mechanism 111 and pipe or conduit 170 with the cylinder 89 for releasing the tables. As soon as the tables are fully released the valve mechanism 174 is actuated for connecting the medium from the tables pump 99 with the tables selector valve mechanism 211. Since this valve is now in its right hand position the pressure thereto will be connected with the cylinder 63 for actuating the piston 61 and table 51 toward the broach ram.

This movement of the table continues until it reaches the position shown in Figure 4, at which time the dog 245 on the dog bar 243, carried by the adjusting screw and lock bar 67, operates to shift the valve mechanism 214 to its second or right hand position as seen in Figure 20. The means for shifting this valve mechanism comprises a flipper dog 499, see Figures 4, 8 and 9, from opposite sides of which project wings 500 and 501. The flipper dog 499 is loosely mounted on the shaft 247 carried by the housings 248 and 250 and the said flipper dog has projecting therefrom the sleeve 249 in which the shaft 247 is journaled. Interiorly of the housing 250 the sleeve 249 has secured thereto a valve shifter lever 502 which has its ball end 503 disposed in a slot 504 formed in the valve stem of the valve member 299 of the valve mechanism 214. This valve member 299 has two operative positions as above described which are determined by a spring loaded detent 505 pivotally mounted within the housing 250 and having its nose 506 cooperating with notches 507 and 508 formed in a plate 509 secured to the sleeve 249.

From the foregoing it will be seen that as soon as the table 51 reaches the broaching position it operates its valve for stopping further movement thereof in the same manner that the table 51A operated its valve mechanism.

Similar to the operation which took place when the work table 51A reached its broaching position, the broach table 51 shifts the valve mechanism 111 to a neutral position through mechanism similar to that employed for shifting the said valve mechanism through the work table 51A. This means is shown in Figures 8 and 9 and comprises a second arm 510 which is similar in all respects to the arm 286 but depends from the rear end of the sleeve 287, from the forward end of which the arm 286 depends. This arm 510 is provided with a face 511 adapted to be engaged by a pin 512 projecting from the side of a plate 513 which is integral with and upstanding from the flipper dog mechanism 499. From this it will be seen that the flipper dog mechanism, upon being actuated to shift the table valve mechanism 214 to its second or stop position, also shifts the control valve mechanism 111 to its neutral position.

Upon the shifting of the valve mechanism 111 to its neutral position the pilot pump is connected with the wedge locking piston and cylinder mechanism 88—89 for locking the tables in their present positions, that is, with the table 51 adjacent the broach ram and the table 51A in a retracted position. As soon as the locking is complete the valve mechanism 174 is shifted to connect the hydraulic pressure to the plunger mechanism 308 and effect the movement of the broach ram through its stroke. Simultaneously, the pressure from the pilot pump 100 is connected through the pipes or conduits 144 and 304, valve mechanism 214 and pipe or conduit 306 for shifting the dogs piston-valve mechanism 242 to the position shown in Figure 20. This, of course, sets the flipper dog mechanism 362 for stopping the broach ram when it reaches the end of its cutting stroke. At the same time the piston valve mechanism 242 is connected up with the tables selector valve for effecting its operation as soon as the broach stroke reaches its return position as fully described in connection with the cycle of operation pertaining to the work table 51A.

The same connection and cycle of operation is employed for translating the broach ram to the right as seen in Figures 1 and 20 as was described above. This movement of the broach ram is at this time stopped by the ram dog 368, thereby permitting the ram to travel its full stroke in a cutting direction since it is at this time operating on the second work table 51. The broach ram, of course, prior to stopping its movement operates the plunger valve mechanism 176 so that as soon as the pilot valve mechanism 305 is actuated to stop its movement the valve mechanism 111 is released for power shifting to its right hand position, as seen in Figure 20, whereupon the work table 51 and its finished work piece are shifted outwardly to the unloading and loading position which when it reaches its position shifts the valve mechanism 214 to the position shown in Figure 20. This, of course, shifts the pilot valve mechanism to a position to effect the return of the broach ram and a setting of the tables selector valve mechanism 211 so that table 51a will next be actuated to the broaching position. The broach ram returns to the left through its idle stroke until the dog 366 thereon engages with the flipper dog ear 371 for then stopping the broach ram in its idle initial position. It will be appreciated that at this time the broach ram is actuated through its maximum return or idle stroke since the nearer or first table 51a is next to be operated upon.

From the foregoing it is believed the full operation of the machine will be apparent without a specific description of this operation since the foregoing described the parts while effecting a full cycle of the machine. However, the cycle may be briefly described as follows:

With the parts as shown in Figures 1 and 2, the handle 122 is actuated to initiate the operation of the machine. This causes the work table 51 to advance from the receded position to the operative position, which when reaching said position initiates the movement of the tool slide for effecting a stock removal from the work. As soon as the slide reaches a point just beyond the said table 51 it automatically retracts the said table whereupon the tool slide is automatically started through its idle or return stroke. The tool slide return movement is stopped as soon as the second table 51a is clear and without continuing to its initial inoperative position.

During the operation on the work on the table 51 the table 51a was being loaded. Therefore, as soon as the tool slide reaches the point ahead of the table 51a a second cycle is initiated. This cycle is again initiated by throwing the handle 122, causing the table 51A to advance to the cutting position which automatically initiates the movement of the tool slide through its second cutting stroke. This time the tool slide continues beyond the point at which it stopped during the first cutting stroke or when the second table 51a is clear, whereupon its movement is stopped. The table 51a is then automatically retracted to its inoperative or loading position, whereupon the movement of the tool slide through an idle stroke is again initiated. The tool slide at this time continues through its idle stroke to its initial position, that is, beyond or ahead of the first work table 51, whereupon the parts are again brought to rest.

During the tooling of the work on the table 51a the table 51 was again loaded, wherefore as soon as the idle movement of the tool slide is stopped a repetition of the cycle may again be initiated which is effected by the handle 122.

From the foregoing it will therefore be noted that there has been provided a machine tool of the surface broaching type from which a maximum output will be obtained with a minimum of lost or idle time. It will be appreciated, however, that the invention is not limited to a machine including merely two tables but may include more by merely duplicating certain of the controlled mechanisms with an effective interlock therebetween as clearly shown in the drawings.

What is claimed is:

1. In a broach of the class described the combination of a horizontally disposed bed, a broach ram mounted on said bed for movement relative thereto, a pair of work supporting tables for alternately presenting a work piece thereon to the action of a broaching tool carried by the ram, automatic means for selectively determining which of the work tables is to be employed, the broach ram having a stroke of sufficient length to pass both tables, and automatic means for limiting the broach stroke to a length necessary for finishing the work associated with the selected table.

2. In a broach of the class described the combination of a horizontally disposed bed, a broach ram mounted on said bed for movement relative thereto, a pair of work supporting tables for alternately presenting a work piece thereon to the action of a broaching tool carried by the ram, automatic means for selectively determining which of the work tables is to be employed, the broach ram having a stroke of sufficient length to pass both tables, automatic means for limiting the broach stroke to a length necessary for finishing the work associated with the selected table, and an interlock between the tables selecting means and the broach stroke limiting means for sequentially effecting the operation thereof.

3. In a broaching machine of the class described the combination of a bed, a broach ram carrying a broaching tool mounted on the bed for translation relative thereto through a cutting stroke and a return idle stroke, a pair of work supporting tables each adapted to support a work piece and having a loading position remote from the path of movement of the broach ram and an operative position adjacent thereto, the broach ram having a cutting stroke of sufficient length to entirely pass both of said tables and having a return or idle stroke to entirely clear said tables, means for alternately actuating the work tables from their loading retracted position to their operative position, and automatically operable means for limiting the broach stroke in a cutting direction to just pass the table in the operative position and to limit the idle or return stroke to a point to just clear the next table to be positioned in the operative position.

4. In a broaching machine of the class described the combination of a bed, a broach ram carrying a broaching tool mounted on the bed for translation relative thereto through a cutting stroke and a return idle stroke, a pair of work supporting tables each adapted to support a work piece and having a loading position remote from the path of movement of the broach ram and an operative position adjacent thereto, the broach ram having a cutting stroke of sufficient length to entirely pass both of said tables and having a return or idle stroke to entirely clear said tables, means for alternately actuating the work tables from their loading retracted position to their operative position, automatically operable means for limiting the broach stroke in a cutting direction to just pass the table in the operative position and to limit the idle or return stroke to a point to just clear the next table to be positioned in the operative position, and means for locking the tables in their loading and operative positions.

5. In a broaching machine of the class described the combination of a bed, a broach ram carrying a broaching tool mounted on the bed for translation relative thereto through a cutting stroke and a return idle stroke, a pair of work supporting tables each adapted to support a work piece and having a loading position remote from the path of movement of the broach ram and an operative position adjacent thereto, the broach ram having a cutting stroke of sufficient length to entirely pass both of said tables and having a return or idle stroke to entirely clear said tables, means for alternately actuating the work tables from their loading retracted position to their operative position, automatically operable means for limiting the broach stroke in a cutting direction to just pass the table in the operative position and to limit the idle or return stroke to a point to just clear the next table to be positioned in the operative position, and means for automatically selecting the particular table to be shifted to the operative position.

6. In a broaching machine of the class described the combination of a bed, a broach ram carrying a broaching tool mounted on the bed for translation relative thereto through a cutting stroke and a return idle stroke, a pair of work supporting tables each adapted to support a work piece and having a loading position remote from the path of movement of the broach ram and an operative position adjacent thereto, the broach ram having a cutting stroke of sufficient length to entirely pass both of said tables and having a return or idle stroke to entirely clear said tables, means for alternately actuating the work tables from their loading retracted position to their operative position, automatically operable means for limiting the broach stroke in a cutting direction to just pass the table in the operative position and to limit the idle or return stroke to a point to just clear the next table to be positioned in the operative position, means for automatically selecting the particular table to be shifted to the operative position, and an interlock between the tables selecting means and the ram stroke limiting means whereby they are sequentially operated.

7. In a two-cycle surface broach of the class described the combination of a bed, a broaching ram mounted thereon for translation relative thereto, a pair of spaced tables each having a loading position remote from the path of movement of the broach ram and an operative position adjacent thereto, the broach ram having a stroke in each direction to completely pass both tables, selecting means for alternately determining the actuation of said tables from their remote loading position to their operative position, manually controlled means for initiating the movement of the selected table, automatic means for stopping the movement of the selected table and effecting the operation of the broach ram, means automatically operable by the broach ram for actuating the table selecting means, and additional automatically operable means effecting an independent cyclic movement of the broach ram for each table.

8. In a broaching machine of the class described the combination of a broaching ram, a pair of work supporting tables each having a loading position remote from the path of movement of the broach ram and an operative position adjacent said path of movement, hydraulic means for effecting the independent movement of the work table and broach ram, a valve for controlling the operation of the ram hydraulic actuating means, said ram having a stroke to entirely pass the two tables in each direction, dog means for actuating the valve to stop the movement of the broach ram, and a plurality of dogs on the ram at each end thereof for variably limiting the broach stroke at each end of its movement.

9. In a broaching machine of the class described the combination of a broaching ram, a pair of work supporting tables each having a loading position remote from the path of movement of the broach ram and an operative position adjacent said path of movement, hydraulic means for effecting the independent movement of the work table and broach ram, a valve for controlling the operation of the ram hydraulic actuating means, said ram having a stroke to entirely pass the two tables in each direction, dog means for actuating the valve to stop the movement of the broach ram, a plurality of dogs on the ram at each end thereof for variably limiting the broach stroke at each end of its movement, and means for selecting which of the plurality of dogs is to be utilized in effecting the operation of the valve dog means.

10. In a broach of the class described the combination of a broach ram, a bed for supporting said ram for translation relative thereto, a pair of work tables in spaced relation and adapted to be alternately advanced into position to be operated thereon by broach ram, the broach ram having a length of stroke sufficient to entirely pass the work tables in each direction, means for limiting the broach stroke so as to just clear the table which is being operated upon when being actuated through a cutting and an idle stroke, and cooperating means carried by each of said tables and the bed for taking the cutting thrust during the cutting stroke.

11. In a broach of the class described the combination of a broach ram, a bed for supporting said ram for translation relative thereto, a pair of work tables in spaced relation and adapted to be alternately advanced into position to be operated thereon by broach ram, the broach ram having a length of stroke sufficient to entirely pass the work tables in each direction, means for limiting the broach stroke so as to just clear the table which is being operated upon when being actuated through a cutting and an idle stroke, cooperating means carried by each of said tables and the bed for taking the cutting thrust during the cutting stroke, and means for locking the tables in their operative positions during the cutting stroke.

12. In a machine tool organization the combination of a reciprocating member, a hydraulic motor for effecting the reverse reciprocations of the member, a hydraulic circuit for controlling the operation of the member including a valve, manual means for shifting said valve to initiate a flow through the circuit and the movement of the member, dog means associated with the valve and operable by the member for effecting the stopping thereof, a plurality of cooperating dogs on the member for individually actuating the valve dog means to variably limit the movement of the member, and selector means operable to determine with which of the member dogs the valve dog means is to cooperate.

13. In a machine tool organization the combination of a bed, a reciprocating member mounted on said bed for translation relative thereto in opposite directions, a plurality of dogs on the member for variably limiting the length of translation of the member in each direction, and means for selectively determining which of the dog means is to be employed to determine the length of stroke of the member.

14. In a broaching machine of the class described the combination of a bed, a horizontally movable ram, a pair of work tables adjacent the bed, each adapted to independently present a work piece to be operated upon by a tool carried by the ram, the ram having a cyclic movement relative to both work tables, and automatic means for limiting the cycle of movement of the ram in accordance with the particular table whose work piece is being operated upon.

15. In a broaching machine of the class described the combination of a bed, a horizontally movable ram, a pair of work tables adjacent the bed, each adapted to independently present a work piece to be operated upon by a tool carried by the ram, the ram having a cyclic movement relative to both work tables, automatic means for limiting the cycle of movement of the ram in accordance with the particular table whose work piece is being operated upon, and selector means for determining the table to be utilized and the cycle of the ram.

16. In a broaching machine of the class described the combination of a bed, a horizontally movable ram, a pair of work tables adjacent the bed, each adapted to independently present a work piece to be operated upon by a tool carried by the ram, the ram having a cyclic movement relative to both work tables, automatic means for limiting the cycle of movement of the ram in accordance with the particular table whose work piece is being operated upon, selector means for determining the table to be utilized and the cycle of the ram, and interlocking means between said selector means and ram cycle limiting means whereby they are synchronized.

17. In a broaching machine of the class described the combination of a bed, a ram mounted thereon for movement relative thereto in a horizontal direction, a pair of work tables disposed adjacent the bed each having a loading station remote from the bed and an operative station adjacent thereto in the line of movement of the ram, the ram having a total movement to fully pass said tables in a cutting direction and to fully clear said tables in an idle or return direction, a hydraulic motor for the ram and each of the work tables for shifting them through their relative strokes, selector means for determining which of the work tables is to be shifted from its inoperative to its operative position, a manually actuable valve for initiating the movement of said selected table, dog control means operated by the table for stopping same in the operative position and initiating the movement of the broach ram, automatic means for limiting the movement of the ram so that the table in the operative position is just cleared, and sequentially operable means for retracting the table and initiating the reverse movement of the ram.

18. In a broaching machine of the class described the combination of a bed, a ram mounted thereon for movement relative thereto in a horizontal direction, a pair of work tables disposed adjacent the bed each having a loading station remote from the bed and an operative station adjacent thereto in the line of movement of the ram, the ram having a total movement to fully pass said tables in a cutting direction and to fully clear said tables in an idle or return direction, a hydraulic motor for the ram and each of the work tables for shifting them through their relative strokes, selector means for determining which of the work tables is to be shifted from its inoperative to its operative position, a manually actuable valve for initiating the movement of said selected table, dog control means operated by the table for stopping same in the operative position and initiating the movement of the broach ram, automatic means for limiting the movement of the ram so that the table in the operative position is just cleared, sequentially operable means for retracting the table and initiating the reverse movement of the ram, and means for stopping the reverse movement of the ram to just clear the next table.

19. In a broaching machine of the class described the combination of a bed, a ram mounted thereon for movement relative thereto in a horizontal direction, a pair of work tables disposed adjacent the bed each having a loading station remote from the bed and an operative station adjacent thereto in the line of movement of the ram, the ram having a total movement to fully pass said tables in a cutting direction and to fully clear said tables in an idle or return direction, a hydraulic motor for the ram and each of the work tables for shifting them through their relative strokes, selector means for determining which of the work tables is to be shifted from its inoperative to its operative position, a manually actuable valve for initiating the movement of said selected table, dog control means operated by the table for stopping same in the operative position and initiating the movement of the broach ram, automatic means for limiting the movement of the ram so that the table in the operative position is just cleared, sequentially operable means for retracting the table and initiating the reverse movement of the ram, means for stopping the reverse movement of the ram to just clear the next table, means for actuating the tables selecting means whereby the operation of the manually actuable valve effects the movement from the inoperative to operative position of the second table, and dog controlled means operated by said second table in its operative position for initiating the movement of the broach ram.

20. In a variable cycle machine tool the combination of a tool slide having a changeable stroke, a pair of work slides adapted to respectively to support a work piece and sequentially present its work piece to the tool slide, means for effecting a first cycle of movement of the parts wherein one table is advanced to present its work piece to the tool slide and effect a movement of the said tool slide and a retracting movement of said parts, and means for effecting a second cyclic movement of the parts wherein the second table is advanced toward the tool slide and the said slide actuated relative thereto and the parts returned to their initial position, said cyclic operating means effecting an extended and reduced stroke of the tool slide, depending upon which table is being operated upon.

MILLARD ROMAINE.
ERWIN G. ROEHM.